US008595783B2

(12) United States Patent
Dewa

(10) Patent No.: US 8,595,783 B2
(45) Date of Patent: Nov. 26, 2013

(54) RECEIVING DEVICE, RECEIVING METHOD, PROGRAM, AND BROADCASTING SYSTEM

(75) Inventor: Yoshiharu Dewa, Tokyo (JP)

(73) Assignee: Sony Corporation, Tokyo (JP)

(*) Notice: Subject to any disclaimer, the term of this patent is extended or adjusted under 35 U.S.C. 154(b) by 156 days.

(21) Appl. No.: 12/980,917

(22) Filed: Dec. 29, 2010

(65) Prior Publication Data

US 2012/0054816 A1 Mar. 1, 2012

Related U.S. Application Data

(60) Provisional application No. 61/378,277, filed on Aug. 30, 2010.

(51) Int. Cl.
H04N 7/173 (2011.01)
(52) U.S. Cl.
USPC ............................ 725/116; 725/110; 709/219
(58) Field of Classification Search
USPC .................. 725/36, 51–61, 100, 106–118, 725/131–142; 709/217–232
See application file for complete search history.

(56) References Cited

U.S. PATENT DOCUMENTS 6,199,206 B1 * 3/2001 Nishioka et al. ................ 725/51
6,571,392 B1 * 5/2003 Zigmond et al. .............. 725/110

FOREIGN PATENT DOCUMENTS

| JP | 2003-131981 | 5/2003 |
|---|---|---|
| JP | 2003-264748 | 9/2003 |
| JP | 2006-287872 | 10/2006 |
| JP | 2007-89059 | 4/2007 |
| JP | 2007-158828 | 6/2007 |
| JP | 2009-31952 | 2/2009 |
| JP | 2009-65422 | 3/2009 |
| JP | 2010-28726 | 2/2010 |

OTHER PUBLICATIONS

U.S. Appl. No. 13/107,604, filed May 13, 2011, Dewa.
U.S. Appl. No. 13/238,138, filed Sep. 21, 2011, Kitazato.
U.S. Appl. No. 13/238,264, filed Sep. 21, 2011, Kitazato.
U.S. Appl. No. 13/238,080, filed Sep. 21, 2011, Kitazato, et al.
U.S. Appl. No. 13/238,277, filed Sep. 21, 2011, Kitazato.
U.S. Appl. No. 13/239,871, filed Sep. 22, 2011, Kitazato.
U.S. Appl. No. 13/238,065, filed Sep. 21, 2011, Kitazato.
U.S. Appl. No. 13/220,231, filed Aug. 29, 2011, Kitahara, et al.
U.S. Appl. No. 13/071,551, filed Mar. 25, 2011, Kitazato, et al.
U.S. Appl. No. 13/081,566, filed Apr. 7, 2011, Kitazato, et al.
U.S. Appl. No. 13/080,866, filed Apr. 6, 2011, Kitazato, et al.
International Search Report issued Sep. 20, 2011, in Patent Application No. PCT/JP2011/068901 (with English-language translation).
International Search Report issued Nov. 15, 2011 in Application No. PCT/JP2011/068834 (With English Translation).

* cited by examiner

*Primary Examiner* — Annan Shang
(74) *Attorney, Agent, or Firm* — Oblon, Spivak, McClelland, Maier & Neustadt, L.L.P.

(57) ABSTRACT

Disclosed herein is a receiving device for receiving AV contents, the receiving device including: an obtaining section configured to obtain a description document described in a program language for displaying contents from a server present on a network connected with the receiving device; a determining section configured to determine whether the obtained the description document is obtained from a first server managed on a broadcaster side broadcasting the AV contents; and a controlling section configured to control execution of the obtained the description document according to a result of determination by the determining section.

10 Claims, 18 Drawing Sheets

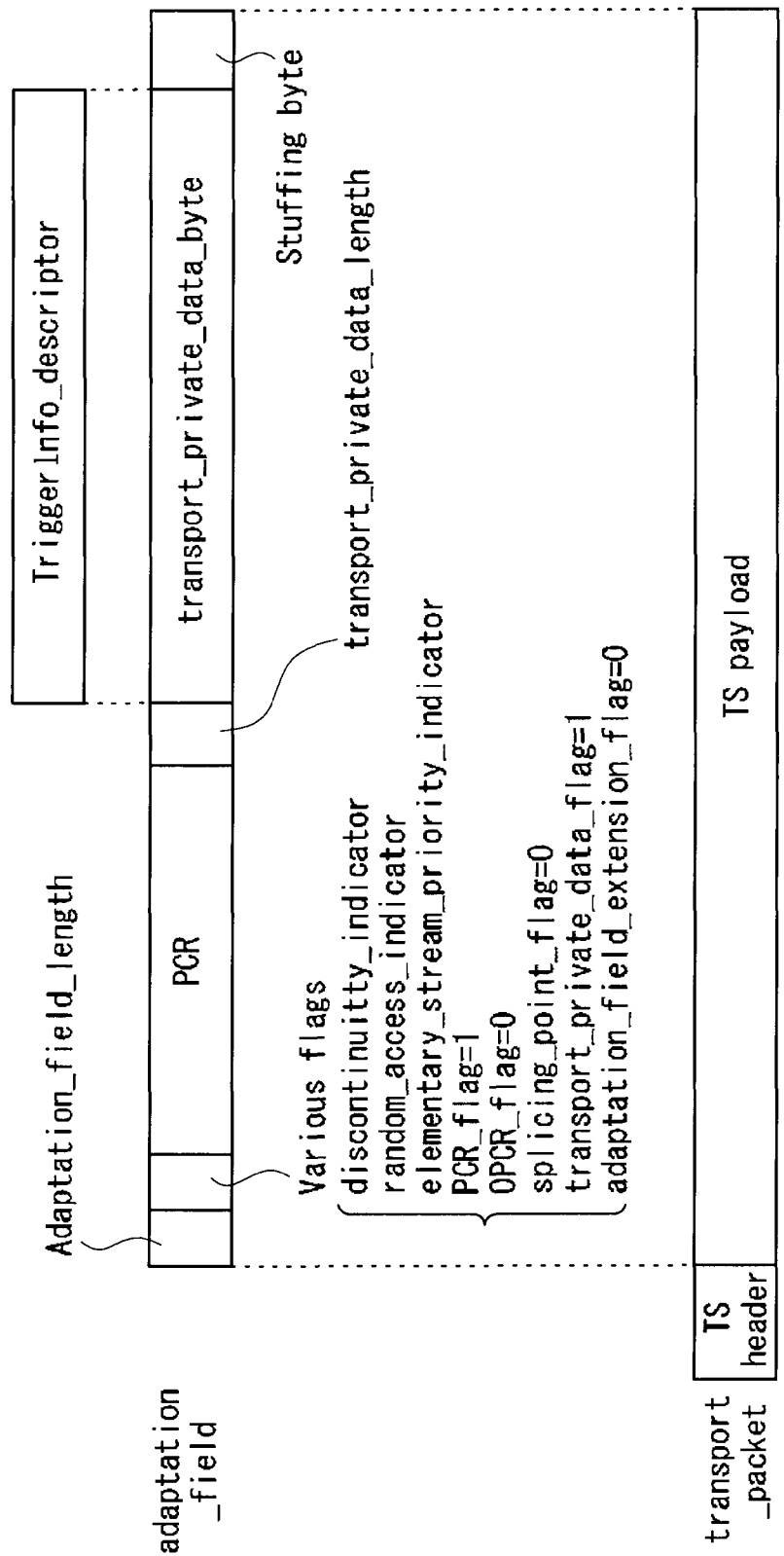

FIG. 8

| ITEM | DESCRIPTION |
|---|---|
| TRIGGER ID | INFORMATION FOR IDENTIFYING TRIGGER INFORMATION |
| TRIGGER TYPE | FOUR TYPES INCLUDING APPLICATION START, APPLICATION END, APPRICATION EVENT, AND PRE-CACHE |
| APPRICATION ID | INFORMATION FOR IDENTIFYING APPRICATION |
| APPRICATION TYPE | INFORMATION INDICATING APPLICATION TYPE (html java ETC.) |
| PROVIDER ID | INFORMATION IDENTIFYING PROVIDER |
| APPRICATION URL | URL OF SERVER FROM WHICH APPLICATION IS OBTAINED WHEN TRIGGER TYPE IS APPLICATION START OR PRE-CACHE |
| STORED APPRICATION ID | INFORMATION FOR IDENTIFYING DOWNLOADED APPLICATION TO BE STARTED WHEN TRIGGER TYPE IS APPLICATION START |
| AUTOMATIC START FLAG | INFORMATION INDICATING AUTOMATIC START OR MANUAL START WHEN TRIGGER TYPE IS APPLICATION START |
| APPLICATION END TIME | TIME TO END APPLICATION WHEN TRIGGER INFORMATION WHOSE TRIGGER TYPE IS APPLICATION END IS NOT RECEIVED |
| APPLICATION NAME | APPLICATION NAME PRESENTED TO USER |
| EVENT ID | INFORMATION FOR IDENTIFYING EVENT WHEN TRIGGER TYPE IS APPLICATION EVENT |

FIG. 9

```
TriggerInfo_descriptor() {
    descriptor_tag                                    8
    descriptor_length                                 8
    trigger_id                                        8
    trigger_type                                      3    "1:app_launch, 2:app_end, 3:app_event  4 precashe
    access_randamize_value                            5
    application_id                                    8
    application_type                                  4
    reserved                                          4
    if(trigger_type==1) {
        auto_start_flag                               1
        app_name_flag                                 1
        net_url_flag                                  1
        stored_app_flag                               1
        reserved                                      4
        app_valid_period                              8
        if(app_name_flag==1) {
            app_name_length                           8
            for(i=0, i<N, i++) {
                app_name_text                         8×N
            }
        }
        if(stored_app_flag==1) {
            stored_app_id                             16
        }
        if(net_url_flag==1) {
            for(i=0, i<M, i++) {
                net_url_text                          8×N
            }
        }
    }
    if(trigger_type==2) {
        app_event_id                                  8
    }
}
```

FIG.17

| ITEM | DESCRIPTION |
|---|---|
| TRIGGER ID | INFORMATION FOR IDENTIFYING TRIGGER INFORMATION |
| TRIGGER TYPE | FIVE TYPES INCLUDING APPLICATION START, APPLICATION END, APPRICATION EVENT, PRE-CACHE, AND SUSPEND |
| APPRICATION ID | INFORMATION FOR IDENTIFYING APPRICATION |
| APPRICATION TYPE | INFORMATION INDICATING APPLICATION TYPE (html java ETC.) |
| PROVIDER ID | INFORMATION IDENTIFYING PROVIDER |
| APPRICATION URL | URL OF SERVER FROM WHICH APPLICATION IS OBTAINED WHEN TRIGGER TYPE IS APPLICATION START OR PRE-CACHE |
| STORED APPRICATION ID | INFORMATION FOR IDENTIFYING DOWNLOADED APPLICATION TO BE STARTED WHEN TRIGGER TYPE IS APPLICATION START |
| AUTOMATIC START FLAG | INFORMATION INDICATING AUTOMATIC START OR MANUAL START WHEN TRIGGER TYPE IS APPLICATION START |
| APPLICATION END TIME | TIME TO END APPLICATION WHEN TRIGGER INFORMATION WHOSE TRIGGER TYPE IS APPLICATION END IS NOT RECEIVED |
| APPLICATION NAME | APPLICATION NAME PRESENTED TO USER |
| EVENT ID | INFORMATION FOR IDENTIFYING EVENT WHEN TRIGGER TYPE IS APPLICATION EVENT |

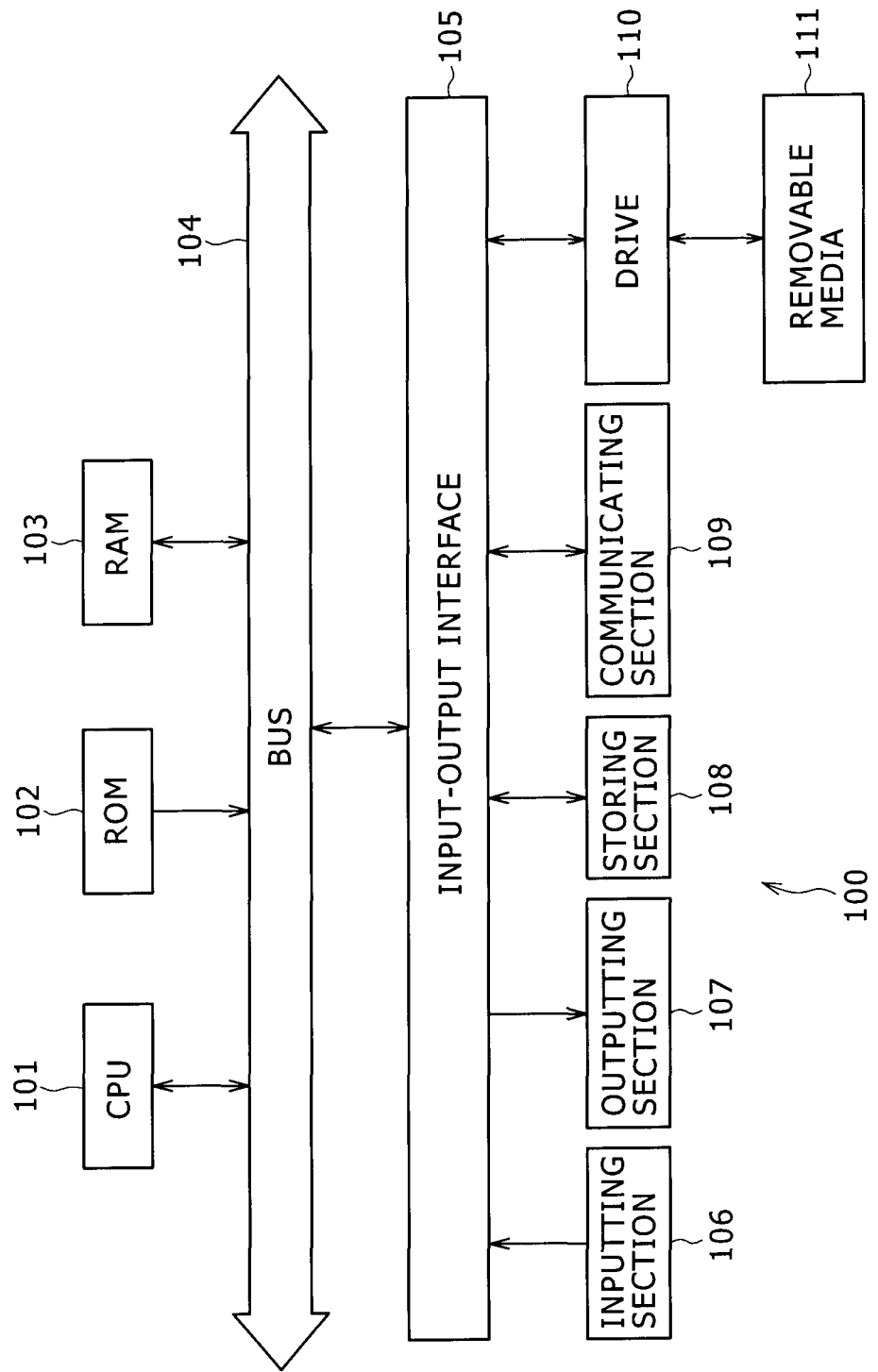

RECEIVING DEVICE, RECEIVING METHOD, PROGRAM, AND BROADCASTING SYSTEM

CROSS REFERENCE TO RELATED APPLICATIONS

This application is related to and claims priority under 35 U.S.C. §119(e) to Provisional Application Ser. No. 61/378,277, filed Aug. 30, 2010, the contents of which are hereby incorporated herein by reference.

BACKGROUND OF THE INVENTION

1. Field of the Invention

The present invention relates to a receiving device, a receiving method, a program, and a broadcasting system, and particularly to a receiving device, a receiving method, a program, and a broadcasting system suitable for use in executing data broadcasting contents in such a manner as to be interlocked with the progress of AV contents corresponding to a so-called program in digital television broadcasting, for example.

2. Description of the Related Art

In Japan, the digitization of television broadcasting has been promoted, and terrestrial digital broadcasting, BS digital broadcasting and the like have been spread. In addition, in digital television broadcasting such as terrestrial digital broadcasting, not only broadcasting of AV contents corresponding to a so-called program but also data broadcasting using BML (Broadcast Markup Language) have been realized (see Japanese Patent Laid-Open No. 2003-131981, for example).

A television receiver receiving data broadcasts can for example display information related to a program (AV contents) being broadcast, display information unrelated to the program being broadcast (a notice of another program, news, a weather forecast, traffic information and the like), and execute an application program interlocked with the program (AV contents) being broadcast.

In addition, the above-described television receiver is configured to behave differently in a case of realizing service managed on a broadcaster side performing digital television broadcasting (for example the service of displaying a weather forecast by data broadcasting) and a case of realizing service not managed on the broadcaster side (for example the service of being connected to the Internet and displaying a home page or the like).

Specifically, when a weather forecast is displayed in data broadcasting as service managed on the broadcaster side, for example, a reading process for reading area information indicating a place of residence of a user which area information is already registered in the television receiver is performed to display the weather forecast corresponding to the place of residence of the user.

On the other hand, when connection to the Internet is established and a home page or the like is displayed as service not managed on the broadcaster side, for example, the above-described reading process or the like is not allowed to be performed so as to prevent processes unintended by the user (area information is illegally read and notified to a malicious third party, for example) from being performed.

Also in Europe, broadcasting corresponding to data broadcasting in Japan has been realized by DVB-MHP (digital video broadcasting-multimedia home platform), which defines description, a distributing system of data broadcasting contents and the like.

SUMMARY OF THE INVENTION

Digital television broadcasting in the U.S. is expected to realize service corresponding to data broadcasting in digital television broadcasting in Japan by obtaining an HTML document described in HTML (Hyper Text Markup Language) from a server managed on a broadcaster side and executing the HTML document in ATSC (Advanced Television Systems Committee) 2.0.

If service is realized by using an application program composed of resources representing video, audio, still images and the like (corresponding to MPEG, MP3, and JPEG in FIG. 1) and a script (execution code) referring to the resources and performing a predetermined process as shown in FIG. 1, an operation mode can be set for each application program, and a specific process such as a reading process or the like can be allowed (or limited) according to the set operation mode.

Specifically, for example, an operation mode allowing (not limiting) performance of the specific process is set for an application program obtained from a server managed by a broadcaster. Then, it suffices to set an operation mode not allowing (limiting) performance of the specific process for an application program obtained from a server on the Internet which server is not managed by the broadcaster.

Incidentally, the application program as shown in FIG. 1 includes for example an application program created in Java language or the like and composed of a plurality of class files (script) and resources (video, audio, still images and the like) of a file structure referred to as jar.

When an application program is composed of resources and a script as shown in FIG. 1, there is a clear boundary between application programs. Therefore an operation mode can be set for each application program to allow (or limit) a specific process (reading process or the like).

When an HTML document planned in digital television broadcasting in the U.S. is used, on the other hand, the setting of an operation mode as in the case of the application program shown in FIG. 1 cannot be made.

Specifically, for example, when service is realized by using an HTML document, a transition is sequentially made to HTML documents to be executed, and each HTML document is executed independently, instead of one application program being executed as shown in FIG. 1.

It is therefore not possible to treat each HTML document executed independently when realizing service as one application program and set an operation mode.

Thus, when the HTML document planned in the U.S. is used, it is not possible to allow (or limit) a specific process according to an operation mode, and a process unintended by a user may occur.

The present invention has been made in view of such a situation. It is desirable to prevent a process unintended by a user from being performed even when service for data broadcasting is realized through document transitions.

According to a first embodiment of the present invention, there is provided a receiving device for receiving AV contents, the receiving device including: obtaining means for obtaining a description document described in a program language for displaying contents from a server present on a network connected with the receiving device; determining means for determining whether the obtained description document is obtained from a first server managed on a broadcaster side broadcasting the AV contents; and controlling means for controlling execution of the obtained description document according to a result of determination by the determining means.

The receiving device can further include extracting means for extracting trigger information relating to the description document executed so as to be interlocked with progress of the AV contents from the AV contents, wherein the obtaining means can obtain a description document from the first server on a basis of the trigger information, and obtain a description document from a second server not managed on the broadcaster side in response to a user operation.

The determining means can determine whether the obtained description document is obtained from the first server on a basis of whether first identifying information for identifying the first server and second identifying information for identifying the server as an obtaining destination from which the description document is obtained coincide with each other.

The receiving device can further include determining means for determining that identifying information for identifying an obtaining destination of a first description document executed so as to be interlocked with progress of the AV contents is the first identifying information.

The receiving device can further include executing means for executing the obtained description document, wherein the controlling means can make the executing means operate in a first management mode allowing a predetermined specific process to be performed by executing the description document when the determining means determines that the description document is obtained from the first server managed on the broadcaster side, and the controlling means can make the executing means operate in a second management mode not allowing the predetermined specific process to be performed by executing the description document when the determining means determines that the description document is not obtained from the first server managed on the broadcaster side.

When the executing means operates in the first management mode, the determining means can determine each time a description document is obtained whether the obtained description document is obtained from the first server, and the controlling means can change the executing means from the first management mode to the second management mode and make the executing means operate in the second management mode in response to determination by the determining means that the description document is not obtained from the first server.

When the executing means operates in the second management mode, the controlling means can change the executing means from the second management mode to the first management mode and make the executing means operate in the first management mode in response to determination by the determining means that the description document is obtained first from the first server.

According to the first embodiment of the present invention, there is provided a receiving method of a receiving device for receiving AV contents, the receiving method including: by the receiving device, an obtaining step of obtaining a description document described in a program language for displaying contents from a server present on a network connected with the receiving device; a determining step of determining whether the obtained description document is obtained from a first server managed on a broadcaster side broadcasting the AV contents; and a controlling step of controlling execution of the obtained description document according to a result of determination in the determining step.

According to the first embodiment of the present invention, there is provided a program for controlling a receiving device for receiving AV contents, the program making a computer of the receiving device perform a process including: an obtaining step of obtaining a description document described in a program language for displaying contents from a server present on a network connected with the receiving device; a determining step of determining whether the obtained description document is obtained from a first server managed on a broadcaster side broadcasting the AV contents; and a controlling step of controlling execution of the obtained description document according to a result of determination in the determining step.

According to the first embodiment of the present invention, a description document described in a program language for displaying contents is obtained from a server present on a network connected with the receiving device, whether the obtained description document is obtained from a first server managed on a broadcaster side broadcasting the AV contents is determined, and execution of the obtained description document is controlled according to a result of the determination.

According to a second embodiment of the present invention, there is provided a broadcasting system including: a transmitting device for transmitting AV contents; and a receiving device for receiving the transmitted AV contents; the transmitting device including transmitting means for storing, in the AV contents, trigger information relating to a description document described in a program language for displaying contents, the description document being to be executed by the receiving device so as to be interlocked with progress of the AV contents, and transmitting the AV contents from a server present on a network connected with the receiving device; and the receiving device including extracting means for extracting the trigger information from the AV contents, obtaining means for obtaining a description document from a first server managed on a broadcaster side broadcasting the AV contents on a basis of the extracted trigger information and obtaining a description document from a second server not managed on the broadcaster side in response to a user operation, determining means for determining whether an obtained description document is obtained from the first server, and controlling means for controlling execution of the obtained description document according to a result of determination by the determining means.

According to the broadcasting system according to the second embodiment of the present invention, the transmitting device stores, in the AV contents, trigger information relating to a description document described in a program language for displaying contents, the description document being to be executed by the receiving device so as to be interlocked with progress of the AV contents, and transmits the AV contents from a server present on a network connected with the receiving device, and the receiving device extracts the trigger information from the AV contents, obtains a description document from a first server managed on a broadcaster side broadcasting the AV contents on a basis of the extracted trigger information and obtains a description document from a second server not managed on the broadcaster side in response to a user operation, determines whether an obtained description document is obtained from the first server, and controls execution of the obtained description document according to a result of determination by the determining means.

According to the present invention, it is possible to prevent a process unintended by a user from being performed even when service for data broadcasting is realized through document transitions.

BRIEF DESCRIPTION OF THE DRAWINGS

FIG. 7 is a diagram showing a position where trigger information is stored in a PCR packet;

FIG. 8 is a diagram showing an example of information items included in trigger information;

FIG. 9 is a diagram showing an example of syntax of trigger information;

FIG. 17 is another diagram showing an example of information items included in trigger information; and FIG. 18 is a block diagram showing an example of configuration of a computer.

DETAILED DESCRIPTION OF THE PREFERRED EMBODIMENT

<1. Embodiment>
[Example of Configuration of Broadcasting System]

Figure 1:
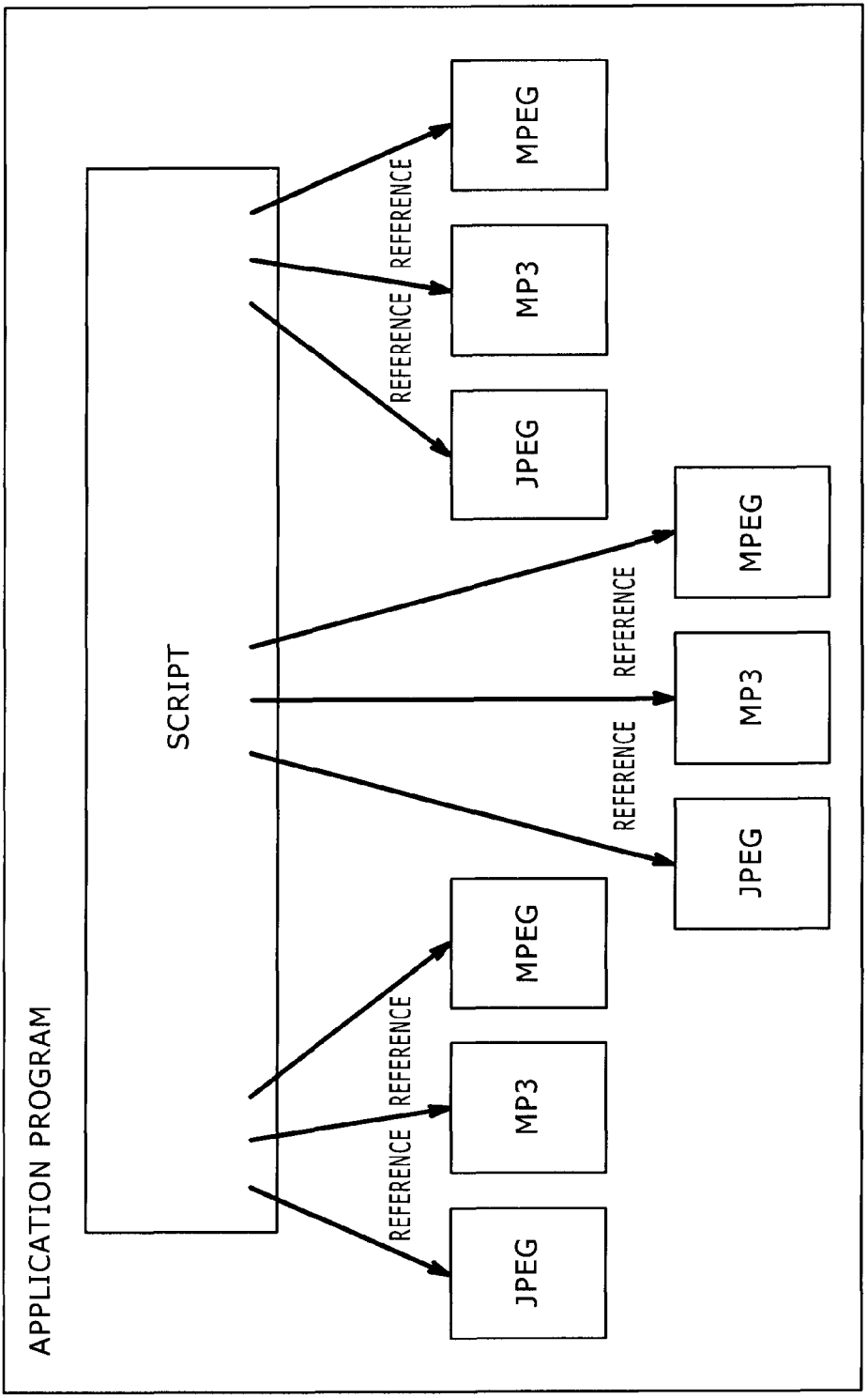
FIG. 1 is a diagram showing an example of an application program composed of resources and a script.
Figure 2:
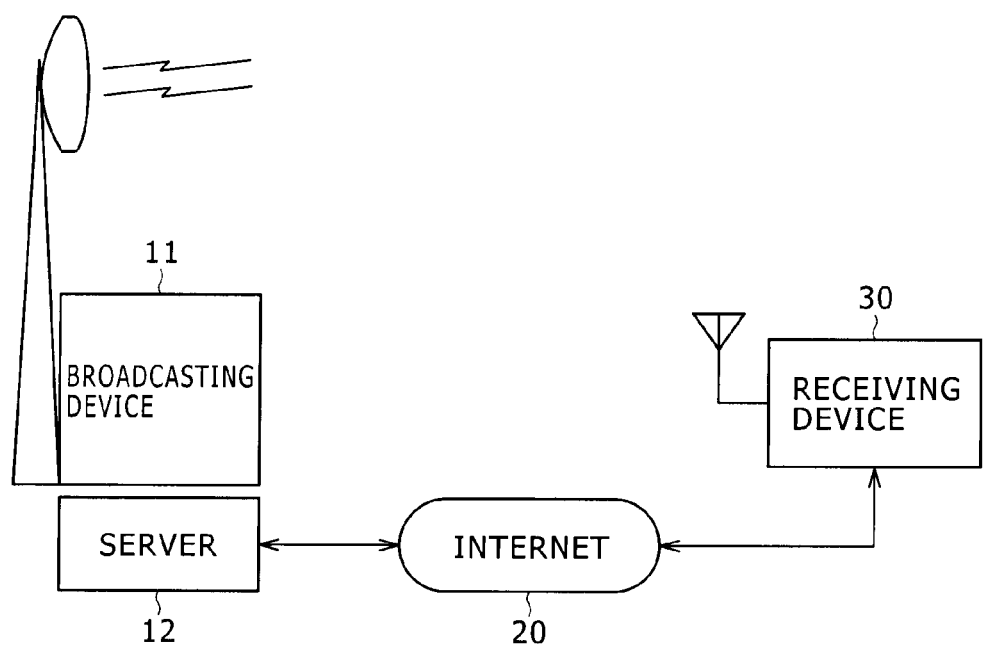
FIG. 2 is a block diagram showing an example of a broadcasting system according to an embodiment of the present invention.

FIG. 2 shows a broadcasting system 1 according to an embodiment of the present invention. The broadcasting system 1 includes a broadcasting device 11 and a server 12 provided on a broadcaster side and a receiving device 30 provided on a receiver side.

Incidentally, a point of the present invention is that a specific process realized by the execution of an HTML document is allowed (or limited) according to whether the HTML document obtained via the Internet 20 and executed in the receiving device 30 is managed on the broadcaster side.

Specifically, for example, when the receiving device 30 executes an HTML document managed on the broadcaster side (for example an HTML document obtained from the server 12 provided on the broadcaster side), the performance of a specific process by the HTML document is allowed (not limited).

Conversely, when the receiving device 30 executes an HTML document not managed on the broadcaster side (for example an HTML document obtained from a server not managed on the broadcaster side but connected to the Internet 20), the performance of a specific process by the HTML document is not allowed (is limited). Details of the point of the present invention will be described later with reference to FIG. 4.

The broadcasting device 11 transmits (broadcasts) a digital television broadcast signal. Suppose that the broadcasting band of the digital television broadcast signal is occupied by a band for video, a band for audio, and a band for control information, and that no band for transmitting contents for data broadcasting is provided.

In addition, in predetermined timing, the broadcasting device 11 stores and transmits trigger information in a packet including PRC (Program Clock Reference) (which packet will hereinafter be referred to as a PCR packet) among TS (Transport Stream) packets forming a TS of the digital television broadcast signal.

The trigger information in this case is composed of information indicating timing of execution of a data broadcasting HTML document representing an HTML document to be executed to realize service for data broadcasting, information indicating a destination from which to obtain the data broadcasting HTML document, and the like. Details of the trigger information will be described later with reference to FIGS. 6 to 9.

The server 12 is managed on the broadcaster side. The server 12 supplies the data broadcasting HTML document or the like according to a request from the receiving device 30 accessing the server 12 via the Internet 20.

The receiving device 30 receives the digital television broadcast signal transmitted from the broadcasting device 11, obtains the video and audio of AV contents corresponding to a television program, and outputs the video to a monitor (not shown) and outputs the audio to a speaker (not shown).

Figure 3:
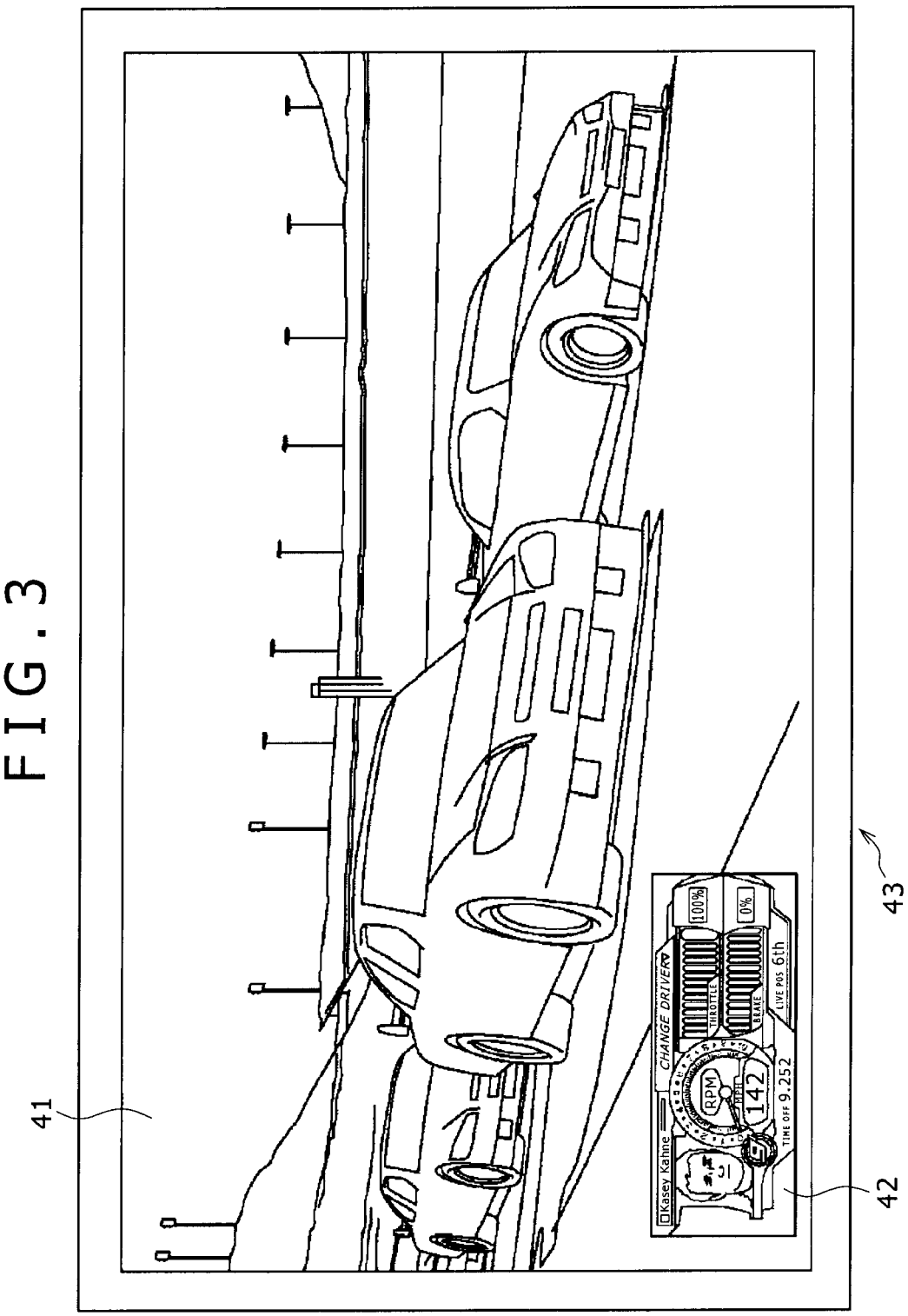
FIG. 3 is a diagram showing an example of display of a screen displayed on a monitor by a receiving device.

In addition, the receiving device 30 accesses the server 12 via the Internet 20, and obtains and executes the data broadcasting HTML document. Thereby, as shown in FIG. 3, the receiving device 30 displays video 43 obtained by superimposing the video 42 of data broadcasting contents on the video 41 of the AV contents on the monitor not shown in the figure.

Incidentally, the receiving device 30 may be present as a discrete unit, or may be built into a television receiver or a video recorder, for example. A detailed configuration of the receiving device 30 will be described later with reference to FIG. 5.

[Outline of the Present Invention]

Figure 4:
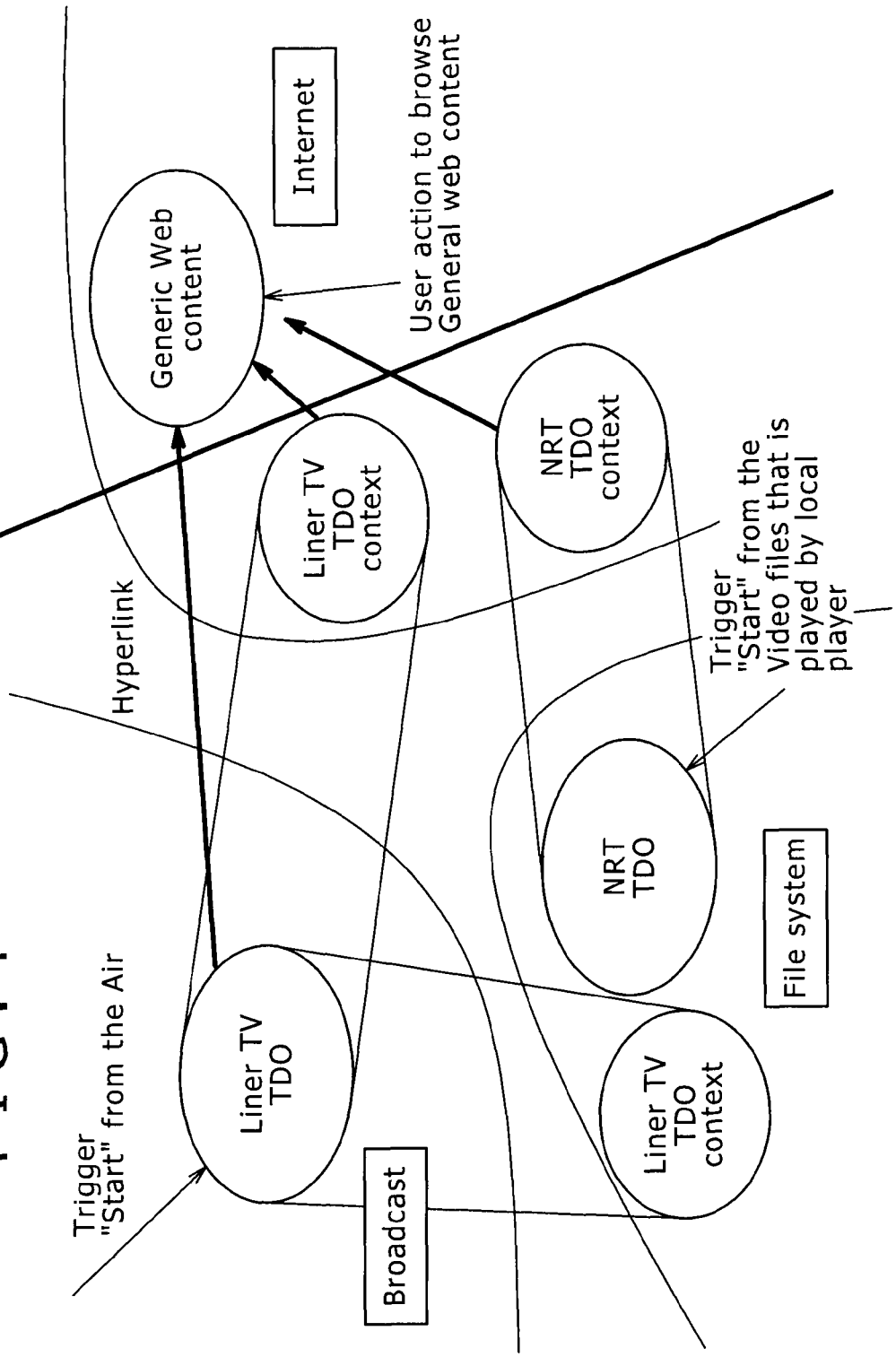
FIG. 4 is a diagram of assistance in explaining an outline of the present invention.

Next, FIG. 4 shows an outline of the present invention.

The receiving device 30 displays the video 43 as shown in FIG. 3 on the basis of trigger information included in the digital television broadcast signal transmitted from the broadcasting device 11.

Specifically, for example, the receiving device 30 displays the video 43 as shown in FIG. 3 on the monitor not shown in the figure by obtaining a data broadcasting HTML document (corresponding to a Liner TV TDO content on the Internet in FIG. 4, for example) from the server 12 and executing the data broadcasting HTML document in response to reception of trigger information (corresponding to Trigger "Start" from the air in FIG. 4, for example) from the broadcasting device 11, or executing a data broadcasting HTML document (corresponding to a Liner TV TDO content in a File system in FIG. 4, for example) obtained from the server 12 in advance and already stored.

In addition, for example, when a program is viewed on the receiving device 30 using download broadcasting, which receives and stores the program (digital television broadcast signal) from the broadcasting device 11 in advance and reproduces the stored program in response to an operation of a user, the receiving device 30 displays the video 43 as shown in FIG. 3 by obtaining a data broadcasting HTML document (corresponding to an NRT TDO content in FIG. 4, for example) from the server 12 and executing the data broadcasting HTML document in response to obtainment of trigger information (corresponding to Trigger "Start" from the Video files that is played by local player in FIG. 4, for example) included in the stored program, or executing a data broadcasting HTML document (corresponding to NRT TDO in FIG. 4, for example) obtained from the broadcasting device 11 in advance and already stored by download broadcasting.

Incidentally, in this case, suppose for example that a driver (face) displayed as video 42 shown in FIG. 3 is provided with a link to a home page of the driver, and is selectable by a user.

When a user operation of selecting the driver on the video 42 in FIG. 4 is performed, the receiving device 30 displays the home page of the driver and the like on the monitor not shown in the figure by obtaining an HTML document for the home page (Generic Web Content in FIG. 4, for example) from a server other than the server 12 and executing the HTML document. Incidentally, the HTML document for the home page represents an HTML document retained by a server not managed on the broadcaster side (server different from the server 12).

When the receiving device 30 executes a data broadcasting HTML document, the receiving device 30 needs to be able to perform a specific process necessary to enhance service for data broadcasting.

Specifically, for example, when a weather forecast corresponding to a place of residence of the user is displayed on the receiving device 30 as service for data broadcasting, the data broadcasting HTML document needs to perform for example a process of reading area information indicating the place of residence of the user, which area information is already registered in the receiving device 30, as the specific process.

On the other hand, when a home page or the like is displayed on the receiving device 30, for example, it is not desirable for the specific process to be performed by the HTML document for the home page.

Specifically, when a home page or the like is displayed, for example, an HTML document for the home page is obtained from a server not managed on the broadcaster side, and executed. In this case, unlike the server 12 managed on the broadcaster side, the server not managed on the broadcaster side may have an HTML document for the home page which HTML document is created by a malicious third party (for example an HTML document performing a process of illegally reading the area information registered in the receiving device 30 and supplying the area information to the server).

Accordingly, a management mode is set in the receiving device 30 such that the specific process can be performed on the left side of a boundary line (represented by a thick line) shown in FIG. 4 and such that the specific process cannot be performed on the right side of the boundary line. The receiving device 30 allows (or limits) the specific process to be performed by an HTML document according to the set management mode.

Incidentally, the specific process refers to a process that causes a disadvantage to the user when illegally performed by a malicious third party (for example a process of illegally obtaining the personal information or the like of the user, thus threatening the security of the user).

The specific process is for example defined in advance by a user, a company that manufactures the receiving device 30, or the like. Incidentally, the specific process includes not only the above-described reading process but also for example a channel selecting process for selecting a channel, a recorder operating process for making the receiving device 30 perform recording or the like when the receiving device 30 functions as a video recorder, an obtaining process for obtaining program information related to a program on a channel being selected, and a bookmark control process for bookmarking a predetermined URL (Uniform Resource Locator).

[Example of Configuration of Receiving Device 30]

Figure 5:
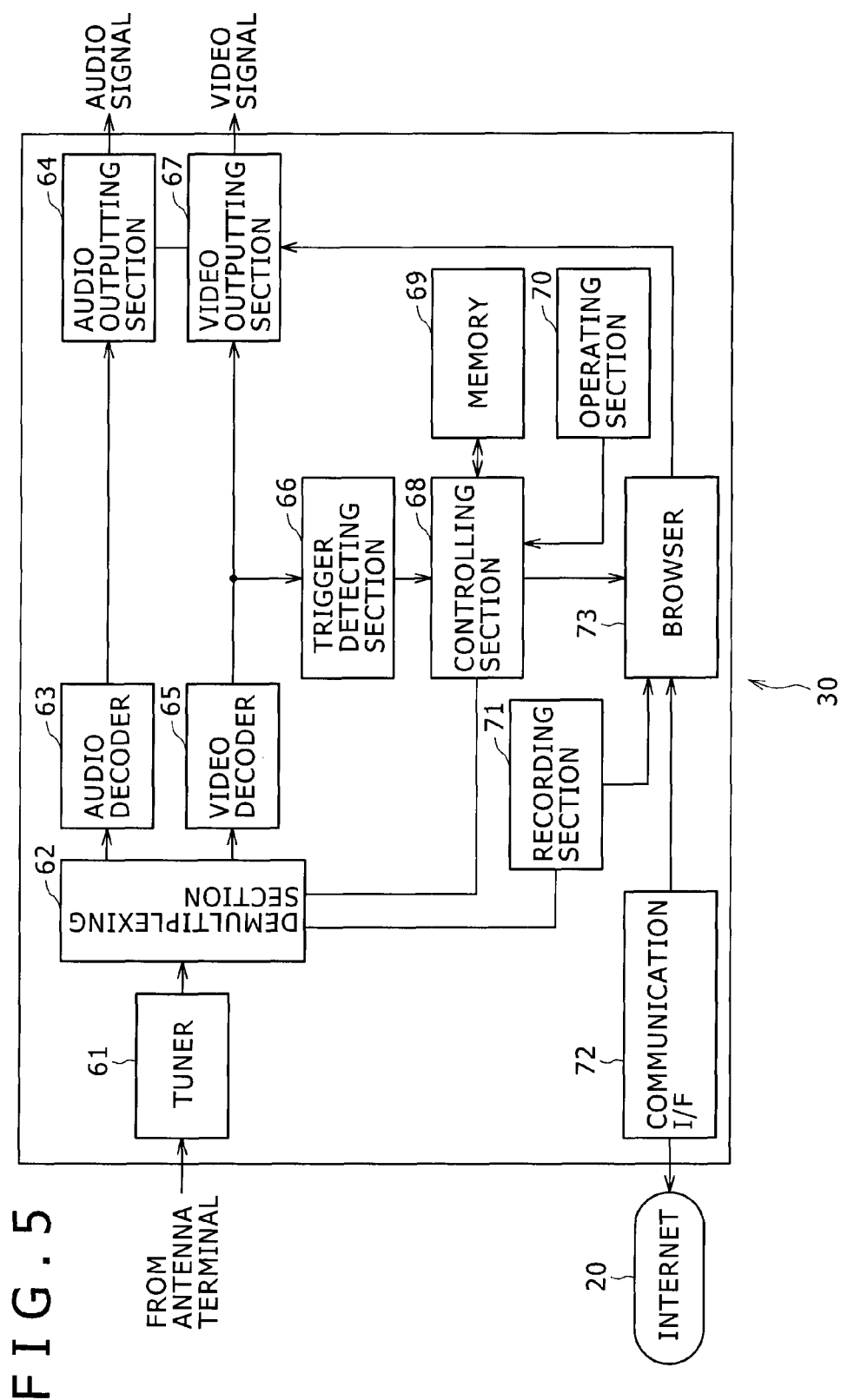
FIG. 5 is a block diagram showing an example of configuration of the receiving device.

FIG. 5 shows an example of configuration of the receiving device 30. The receiving device 30 includes a tuner 61, a demultiplexing section 62, an audio decoder 63, an audio outputting section 64, a video decoder 65, a trigger detecting section 66, a video outputting section 67, a controlling section 68, a memory 69, an operating section 70, a recording section 71, a communication I/F 72, and a browser 73.

The tuner 61 receives and demodulates a digital television broadcast signal corresponding to a channel selected by the user, and outputs a resulting TS to the demultiplexing section 62. The demultiplexing section 62 divides the TS input from the tuner 61 into an audio coded signal, a video coded signal, and a control signal, and outputs the audio coded signal, the video coded signal, and the control signal to the audio decoder 63, the video decoder 65, and the controlling section 68, respectively.

Further, the demultiplexing section 62 extracts a PCR packet including trigger information disposed in the TS, and then outputs the PCR packet to the controlling section 68.

The audio decoder 63 decodes the input audio coded signal, and outputs a resulting audio signal to the audio outputting section 64. The audio outputting section 64 outputs the input audio signal to a subsequent stage (speaker, for example).

The video decoder 65 decodes the input video coded signal, and outputs a resulting video signal to the trigger detecting section 66 and the video outputting section 67.

The trigger detecting section 66 always monitors the input video signal, detects trigger information embedded in the video signal, and supplies the trigger information to the controlling section 68. Incidentally, the trigger information can also be transmitted so as to be embedded in the video signal of the AV contents corresponding to the digital television broadcast signal.

Thus, when the trigger information is embedded in the video signal and transmitted from the broadcasting device 11 to the receiving device 30, the trigger detecting section 66 detects the trigger information embedded in the input video signal.

Suppose in the following that the trigger information is transmitted in a state of being stored in a PCR packet. Description of the case where the trigger information is transmitted in a state of being embedded in the video signal will be omitted as appropriate.

The video outputting section 67 outputs the video signal input from the video decoder 65 to a subsequent stage (monitor, for example). In addition, the video outputting section 67 combines the video signal (corresponding to the video 42 in FIG. 3, for example) for data broadcasting which video signal is input from the browser 73 with the video signal (corresponding to the video 41 in FIG. 3, for example) input from the video decoder 65, and outputs the result to the subsequent stage.

Further, the video outputting section 67 outputs a video signal for showing a home page or the like, which video signal is input from the browser 73, to the subsequent stage.

Incidentally, an HDMI (High-Definition Multimedia Interface) cable, for example, can be used for output from the audio outputting section 64 and the video outputting section 67 to the subsequent stage.

The controlling section 68 controls each block forming the receiving device 30 by executing a controlling program recorded in the memory 69 in advance. The controlling section 68 also controls the obtainment, execution (starting), event firing, ending and the like of a data broadcasting HTML document for realizing service for data broadcasting interlocked with a television program on the basis of the trigger information input from the demultiplexing section 62 (or the trigger detecting section 66).

The controlling program executed by the controlling section 68 is recorded in the memory 69 in advance. The controlling program can be updated on the basis of the digital television broadcast signal or update data obtained via the Internet 20.

In addition, management mode information indicating a management mode is recorded in the memory 69. The management mode is changed by rewriting the management mode information. Details of the management mode will be described later with reference to FIG. 13 and FIG. 14. The operating section 70 receives various operations from the user, and notifies operating signals corresponding to the operations to the controlling section 68.

When a data broadcasting HTML document is distributed using the digital television broadcast signal, the recording section 71 retains the distributed data broadcasting HTML document on a built-in recording medium.

The communication I/F 72 connects itself to the server 12 via the Internet 20 under control of the browser 73. Then, under control of the browser 73, the communication I/F 72 obtains a data broadcasting HTML document from the server 12 via the Internet 20, and supplies the data broadcasting HTML document to the browser 73.

The communication I/F 72 also connects itself to a server other than the server 12 via the Internet 20 under control of the browser 73. Then, under control of the browser 73, the communication I/F 72 obtains an HTML document for a home page from the server other than the server 12 via the Internet 20, and supplies the HTML document to the browser 73.

The browser 73 under control of the controlling section 68 executes the data broadcasting HTML document from the communication I/F 72, thereby generates a video signal for data broadcasting, and supplies the video signal for data broadcasting to the video outputting section 67.

In addition, the browser 73 under control of the controlling section 68 executes the HTML document for the home page from the communication I/F 72, thereby generates a video signal for showing the home page and the like, and supplies the video signal to the video outputting section 67.

[Details of Trigger Information]

Figure 6:
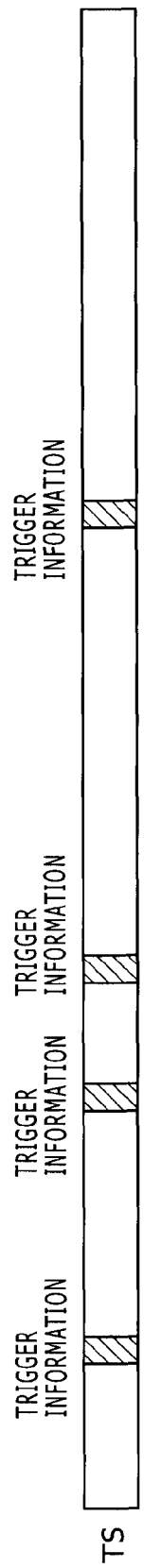
FIG. 6 is a diagram showing a concept in a case where trigger information is stored and transmitted in PCR packets of a TS.

FIG. 6 shows a concept in a case where trigger information is stored and transmitted in PCR packets of a TS. As shown in FIG. 6, not all PCR packets store trigger information, but trigger information is stored in PCR packets only in appropriate timing for interlocking with AV contents corresponding to a television program.

Incidentally, depending on contents of trigger information, trigger information of the same contents may be transmitted a plurality of times in consideration of a case where the trigger information is not received by the receiving device 30.

FIG. 7 shows a position where trigger information is stored in a PCR packet. The PCR packet has PCR stored in the adaptation_field of a TS packet. The trigger information (TriggerInfo_descriptor) is stored in transport_private_data_byte following the PCR. Incidentally, when trigger information is stored, the transport_private_data_flag of Various_flags provided in front of the PCR is set at one.

FIG. 8 shows an example of information items included in trigger information.

A trigger ID is information for identifying the trigger information in question. When trigger information of the same contents is transmitted a plurality of times, the trigger ID of each piece of trigger information is identical. A trigger type indicates that the trigger information in question is one of an application start (giving an instruction to obtain and execute (start) a data broadcasting HTML document), an application end (giving an instruction to end the data broadcasting HTML document being executed), an application event (giving an instruction to fire an event (update of display contents or the like) in the data broadcasting HTML document being executed), and a pre-cache (giving an instruction only to obtain the data broadcasting HTML document).

An application ID is information for identifying the data broadcasting HTML document corresponding to the trigger information in question. An application type is information indicating the type (html) of the data broadcasting HTML document corresponding to the trigger information in question. A provider ID is information for identifying a provider (broadcasting station or the like) performing service for execution of the data broadcasting HTML document corresponding to the trigger information in question. An application URL (Uniform Resource Locator) is the URL of a destination from which to obtain the data broadcasting HTML document in the case where the trigger type is the application start or the pre-cache. A stored application ID is described only when specifying the stored (already obtained) data broadcasting HTML document to be started without instantly obtaining the data broadcasting HTML document in the case where the trigger type is the application start.

An automatic start flag is described in the case where the trigger type is the application start. The automatic start flag is set on or off. When the automatic start flag is on, an automatic start is made (the data broadcasting HTML document is started automatically). When the automatic start flag is off, a manual start is made (the user is prompted to perform an operation input, and a start is made in response to the performance of the operation input).

An application end time is information indicating a time to end the data broadcasting HTML document when the trigger information whose trigger type is the application end cannot be received.

An application name is the name of service (realized by the data broadcasting HTML document) for data broadcasting to be presented to the user when the automatic start flag indicates the manual start, for example. An event ID is information for identifying an event when the trigger type is the application event. Incidentally, the trigger information does not always include all of the above-described items, but includes only necessary items in the timing of the trigger information.

FIG. 9 shows an example of syntax of the trigger information. Incidentally, the syntax of the trigger information is arbitrary, and is not limited to FIG. 9.

[Trigger Information Corresponding Process]

Description will next be made of a trigger information corresponding process performed when the receiving device 30 receives trigger information.

Figure 10:
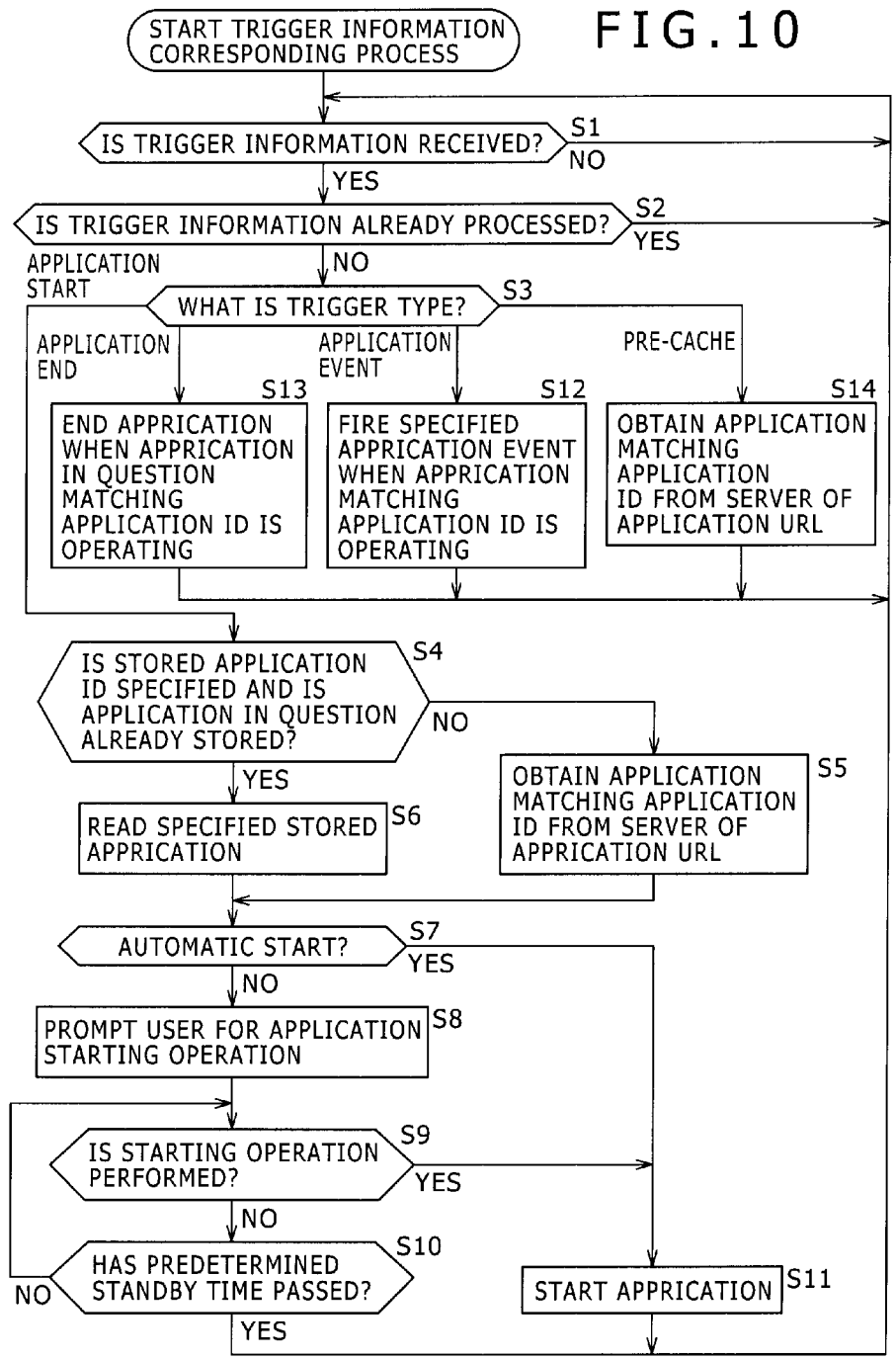
FIG. 10 is a flowchart of assistance in explaining a trigger information corresponding process performed by the receiving device.

FIG. 10 is a flowchart of assistance in explaining the trigger information corresponding process. This trigger information corresponding process is repeatedly performed while the user is viewing a television program, that is, while a digital television broadcast signal is received.

In step S1, the controlling section 68 stands by until a PCR packet including trigger information is received on the basis of input from the demultiplexing section 62. When a PCR packet including trigger information is received, the controlling section 68 advances the process to step S2.

In step S2, the controlling section 68 extracts the trigger information from the received PCR packet, and determines whether a process from step S3 on down has already been performed for the trigger information on the basis of the trigger information. When it is determined that the process from step S3 on down has already been performed, the process is returned to step S1 to repeat the process from step S1 on down. When it is determined that the process from step S3 on down has not been performed for the trigger information, on the other hand, the process is advanced to step S3.

In step S3, the controlling section 68 determines whether the trigger type of the trigger information in question is the application start, the application event, the application end, or the pre-cache.

When it is determined in step S3 that the trigger type of the trigger information in question is the application start, the process is advanced to step S4.

In step S4, the controlling section 68 determines whether a stored application ID is specified in the trigger information in question and whether the data broadcasting HTML document corresponding to the trigger information is already stored in the recording section 71.

When the determination is made in the negative in step S4, the process is advanced to step S5. In step S5, the controlling section 68 controls the browser 73 so as to make the browser 73 access the server 12 corresponding to the application URL of the trigger information and obtain the data broadcasting HTML document corresponding to the application ID of the trigger information. When the corresponding data broadcasting HTML document is already obtained from the server 12 corresponding to the above URL and pre-cached in step S14 to be described later, the process of step S5 is skipped, and the data broadcasting HTML document is used in a process from step S7 on down. The process is thereafter advanced to step S7.

When it is determined in step S4 that the stored application ID is specified in the trigger information in question and that the data broadcasting HTML document corresponding to the trigger information is already stored in the recording section 71, the process is advanced to step S6. In step S6, the controlling section 68 controls the browser 73 so as to make the browser 73 read the data broadcasting HTML document corresponding to the stored application ID of the trigger information from the recording section 71. The process is thereafter advanced to step S7.

In step S7, the controlling section 68 determines whether the automatic start flag of the trigger information indicates the automatic start.

When it is determined in step S7 that the automatic start flag of the trigger information does not indicate the automatic start (that is, the automatic start flag of the trigger information indicates the manual start), the process is advanced to step S8. In step S8, the browser 73 prompts the user for an operation of starting (operation of executing) the data broadcasting HTML document by displaying for example "Execute (application name)?" on a screen under control of the controlling section 68. When it is determined in step S9 that the starting operation is input from the user in response to the prompt display, the process is advanced to step S11. In step S11, the browser 73 starts (executes) the data broadcasting HTML document obtained in step S5 or read in step S6 under control of the controlling section 68. Thereafter, the process is returned to step S1, and the process from step S1 on down is repeated.

Incidentally, when it is determined in step S9 that the starting operation is not input from the user after the prompt display in step S8, and it is determined in step S10 that a predetermined time has passed without the starting operation being input from the user, the process is returned to step S1, and the process from step S1 on down is repeated.

When it is determined in step S7 that the automatic start flag of the trigger information indicates the automatic start, the process is advanced to step S11. In step S11, the browser 73 starts the data broadcasting HTML document obtained in step S5 or read in step S6 under control of the controlling section 68. Thereafter, the process is returned to step S1, and the process from step S1 on down is repeated.

When it is determined in step S3 that the trigger type of the trigger information in question is the application event, the process is advanced to step S12. In step S12, the controlling section 68 controls the browser 73 so as to fire (execute) an event corresponding to the event ID of the trigger information in the data broadcasting HTML document being executed only when the application ID of the trigger information in question and the application ID of the data broadcasting HTML document being executed coincide with each other. Thereafter, the process is returned to step S1, and the process from step S1 on down is repeated.

When it is determined in step S3 that the trigger type of the trigger information in question is the application end, the process is advanced to step S13. In step S13, the controlling section 68 controls the browser 73 so as to end the data broadcasting HTML document being executed only when the application ID of the trigger information in question and the application ID of the data broadcasting HTML document being executed coincide with each other. Thereafter, the process is returned to step S1, and the process from step S1 on down is repeated.

Incidentally, even in a case where the trigger information whose trigger type is the application end is not received, the data broadcasting HTML document being executed is ended when a present time reaches the application end time described in the trigger information at the time of starting the data broadcasting HTML document being executed.

When it is determined in step S3 that the trigger type of the trigger information in question is the pre-cache, the process is advanced to step S14. In step S14, the controlling section 68 controls the browser 73 to make the browser 73 access the server 12 corresponding to the application URL of the trigger information, obtain the data broadcasting HTML document corresponding to the application ID of the trigger information, and store (pre-cache) the data broadcasting HTML document in storing means such as a cache memory or the like included in the browser 73. Thereafter, the process is returned to step S1, and the process from step S1 on down is repeated.

When the trigger type is the pre-cache as in step S14, the corresponding data broadcasting HTML document can be obtained before the broadcasting time of the television program desired to be interlocked. Thereby the corresponding data broadcasting HTML document can be executed at the same time as a start of the television program desired to be interlocked. This concludes the description of the trigger information corresponding process.

[Example of Screen Display when Data Broadcasting HTML Document is Executed]

Figure 11:
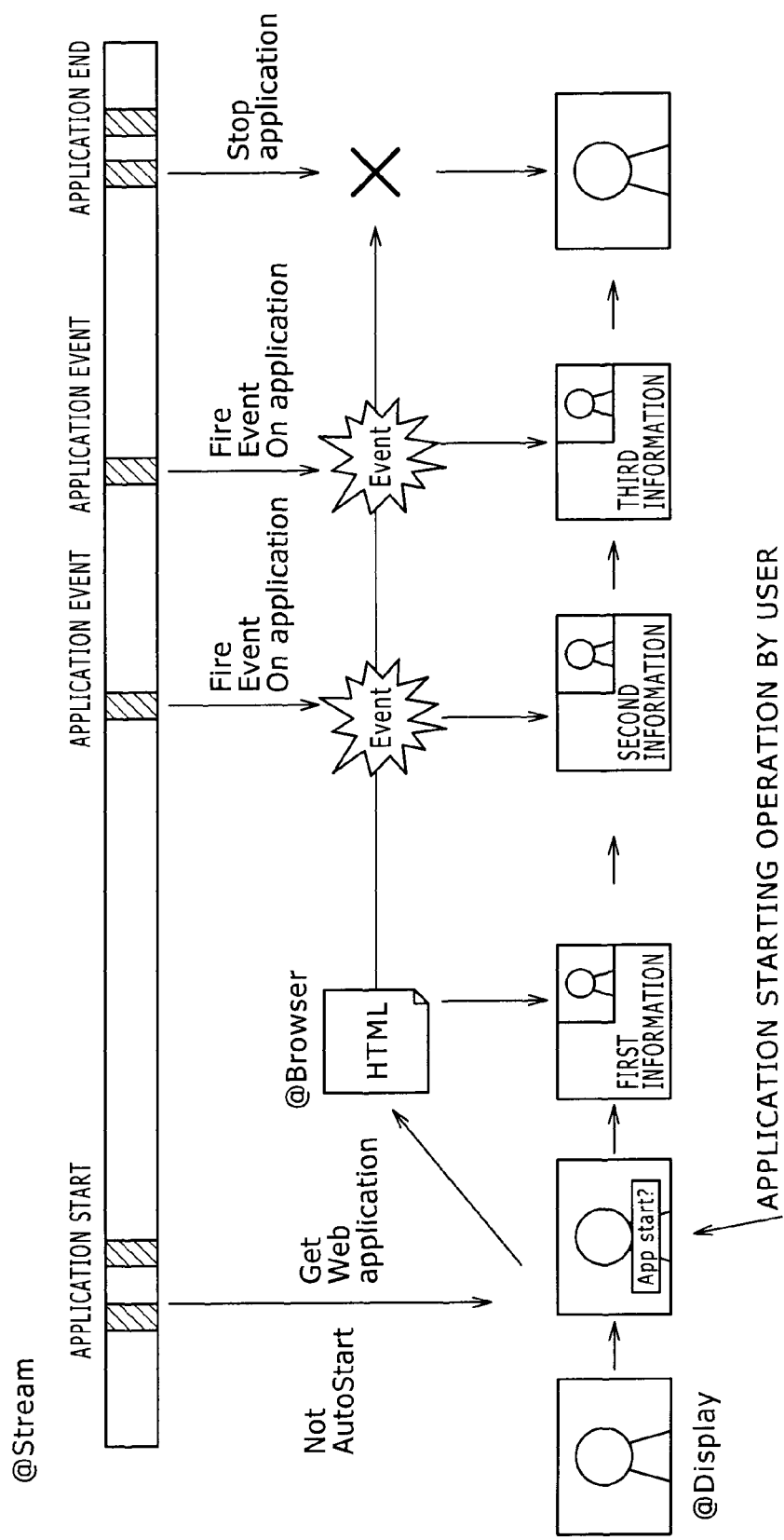
FIG. 11 is a diagram showing an example of transitions of a screen when a data broadcasting HTML document is executed so as to be interlocked with the progress of a television program.

Next, FIG. 11 shows transitions of a screen when a data broadcasting HTML document is executed so as to be interlocked with the progress of a television program in a case where the automatic start flag of trigger information is off (manual start).

When trigger information whose trigger type is the application start and whose automatic start flag is off (manual start) is received while the user is viewing a television program, a corresponding data broadcasting HTML document (corresponding to HTML in FIG. 11) is obtained. Next, a display (corresponding to "App Start?" in FIG. 11) prompting the user for an operation of starting the data broadcasting HTML document is displayed in a state of being superimposed on the video of the television program. When the user inputs the starting operation in response to the prompt, the data broadcasting HTML document is executed, and screen display becomes for example the video 43 obtained by combining the video 41 of the television program with the video 42 of data broadcasting contents as shown in FIG. 3.

When trigger information whose trigger type is the application event is received in a state of the data broadcasting HTML document being executed, an event corresponding to the event ID of the trigger information is fired in the data broadcasting HTML document being executed. Thereby, an area (for example an area displaying the video 42 in FIG. 3) displaying the data broadcasting contents in the screen display is changed to video corresponding to the event ID of the trigger information (for example changed from first information to second information or from the second information to third information).

When trigger information whose trigger type is the application end is thereafter received, the data broadcasting HTML document being executed is ended, and only the video 41 of the television program is displayed on the entire screen.

[Another Example of Screen Display when Data Broadcasting HTML Document is Executed]

Incidentally, a data broadcasting HTML document executed so as to be interlocked with the progress of a television program does not necessarily involve screen display. When such a data broadcasting HTML document is used, the data broadcasting HTML document can be executed without being noticed by the user of the receiving device 30. Such a data broadcasting HTML document can be applied to a case of surveying the audience rating of a television program, for example. Specifically, when whether a television program is viewed is recorded so as to correspond to trigger information whose trigger type is the application event, and a result of the recording is notified to a predetermined server or the like in predetermined timing, the audience rating of the television program can be surveyed at intervals of transmission of the trigger information whose trigger type is the application event.

Figure 12:
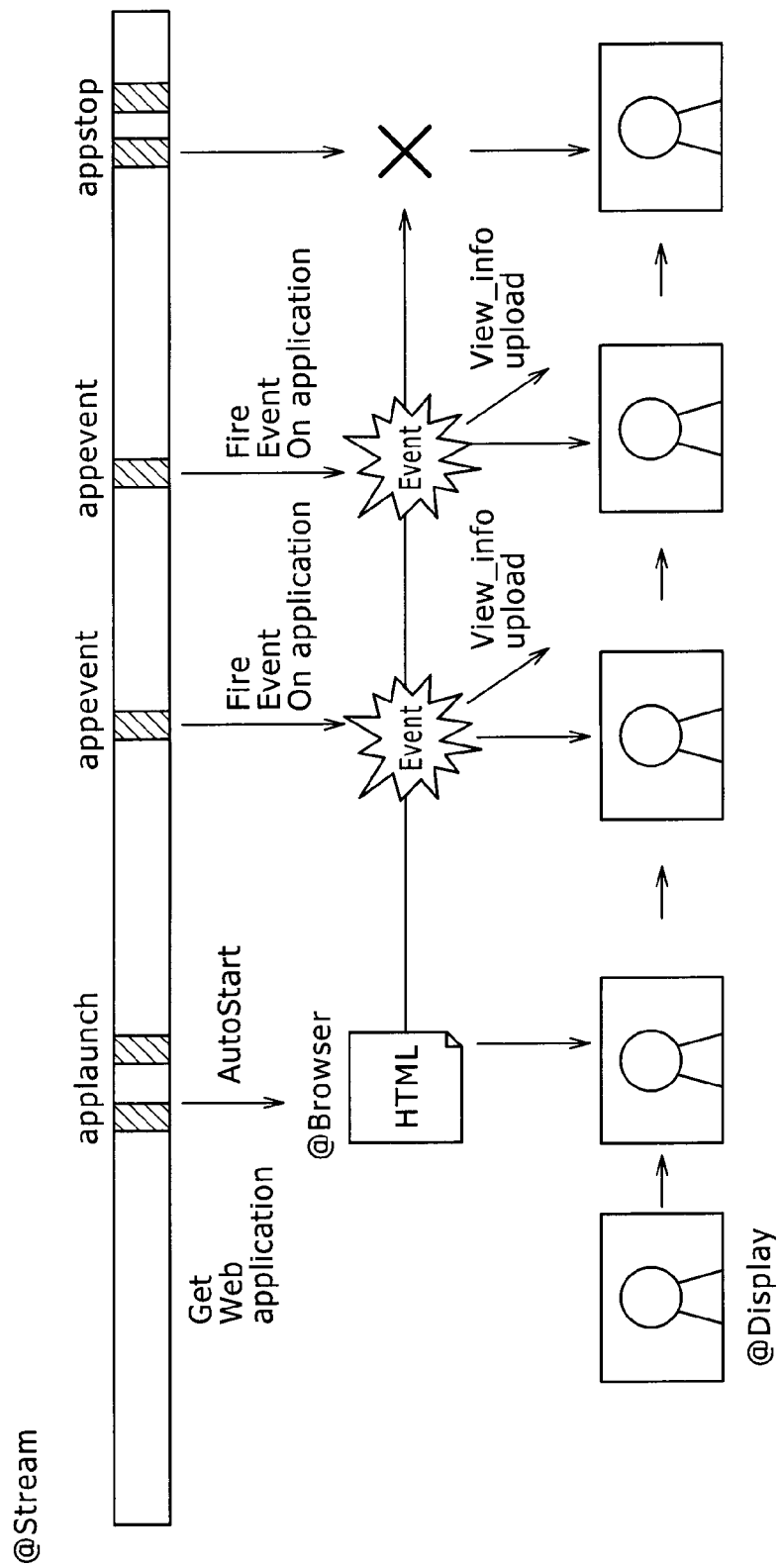
FIG. 12 is a diagram showing an example of transitions of a screen when a data broadcasting HTML document not involving screen display is executed so as to be interlocked with the progress of a television program.

FIG. 12 shows transitions of a screen when a data broadcasting HTML document not involving screen display is executed so as to be interlocked with the progress of a television program in a case where the automatic start flag of trigger information is on (automatic start).

When trigger information whose trigger type is the application start and whose automatic start flag is on (automatic start) is received while the user is viewing a television program, a corresponding data broadcasting HTML document is obtained and executed. However, screen display is not changed with only the video 41 of the television program displayed.

When trigger information whose trigger type is the application event is received in a state of the data broadcasting HTML document being executed, an event corresponding to the event ID of the trigger information is fired in the data broadcasting HTML document being executed. Also in this case, screen display is not changed with the video 41 of the television program displayed.

When trigger information whose trigger type is the application end is thereafter received, the data broadcasting HTML document being executed is ended.

[Life Cycle of Data Broadcasting Contents]

Figure 13:
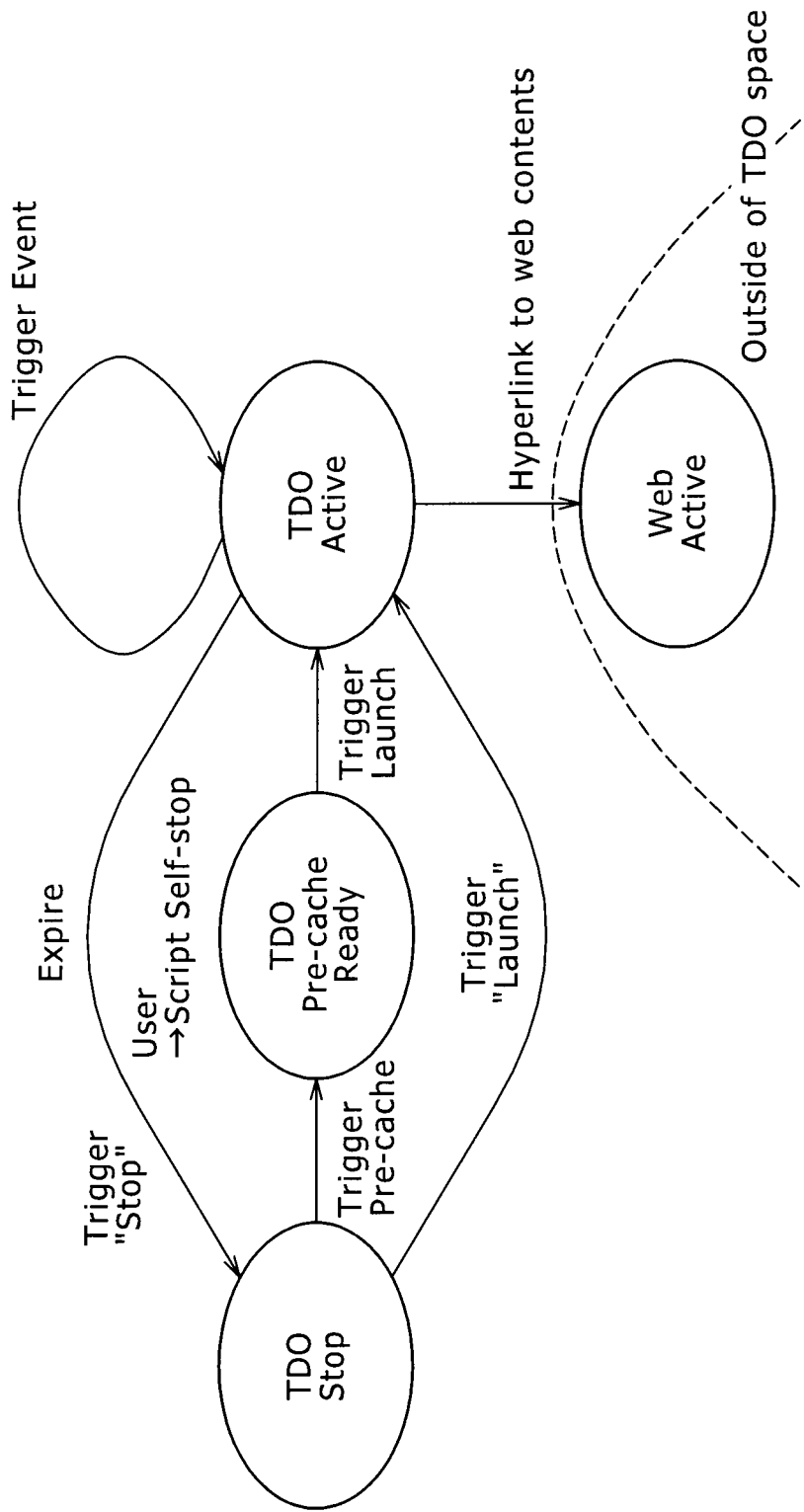
FIG. 13 is a diagram showing an example of a life cycle of a data broadcasting HTML document.

Next, FIG. 13 shows an example of a life cycle of a data broadcasting HTML document.

When trigger information whose trigger type is the application start is received in a case where a data broadcasting HTML document to be obtained and executed by the receiving device 30 is in a TDO stop operation state (corresponding to TDO Stop in FIG. 13), that is, in a case where the receiving device 30 has not obtained the data broadcasting HTML document, a transition is made from the TDO stop operation state to a TDO active operation state (corresponding to TDO Active in FIG. 13), and the data broadcasting HTML document is obtained from the server 12.

Then, a display prompting the user for an operation of starting the data broadcasting HTML document is displayed in a state of being superimposed on the video of a television program. When the user inputs the starting operation in response to the prompt, the data broadcasting HTML document is started, and screen display becomes for example the video 43 obtained by combining the video 41 of the television program with the video 42 of data broadcasting contents as shown in FIG. 3.

In the TDO active operation state, the receiving device 30 can perform a specific process to display the video 42 of the data broadcasting contents by the obtained data broadcasting HTML document. That is, the management mode of the receiving device 30 in the TDO active operation state is "Broadcast managed," allowing the specific process using the data broadcasting HTML document obtained from the server 12 managed on the broadcaster side.

When trigger information whose trigger type is the application event is received in the TDO active operation state, an event corresponding to the event ID of the trigger information is fired in the data broadcasting HTML document being executed.

Incidentally, when trigger information whose trigger type is the application end is received or an application end time has arrived in the TDO active operation state, a transition is made from the TDO active operation state to the TDO stop state, and the obtained data broadcasting HTML document is discarded, for example.

In addition, when trigger information whose trigger type is the pre-cache is received in the TDO stop operation state, a transition is made from the TDO stop operation state to a TDO pre-cache ready operation state, and the corresponding data broadcasting HTML document is obtained and pre-cached.

When trigger information whose trigger type is the application start is received in the TDO pre-cache ready operation state, a transition is made from the TDO pre-cache ready operation state to the TDO active operation state. Then, the pre-cached data broadcasting HTML document is started in the TDO active operation state.

In addition, when a button or the like provided with a link to a home page of an automobile or the like is pressed by a user operation in the TDO active operation state, a transition is made from the TDO active operation state to a Web active operation state (corresponding to Web Active in FIG. 13). Then, in the Web active operation state, an HTML document for the home page from a server not managed on the broadcaster side (server other than the server 12) is executed for example to display the home page of the automobile or the like.

In the Web active operation state, the receiving device 30 cannot perform a specific process by the obtained HTML document for the home page. That is, the management mode of the receiving device 30 in the Web active operation state is "Broadcast unmanaged," not allowing a specific process using the HTML document for the home page obtained from a server not managed on the broadcaster side (server other than the server 12).

In the TDO active operation state (the management mode is set at "Broadcast managed"), a specific process such for example as reading area information already recorded in the receiving device 30 needs to be allowed in order to provide service for data broadcasting.

In the Web active operation state (the management mode is set at "Broadcast unmanaged"), on the other hand, the specific process needs to be prevented from being performed in order to prevent the area information already recorded in the receiving device 30 from being illegally read and leaked.

Accordingly, in the receiving device 30, as described above, when an HTML document to be executed is obtained from the server 12 managed on the broadcaster side, the management mode is set at "Broadcast managed" to allow the specific process.

Conversely, in the receiving device 30, when an HTML document to be executed is obtained from a server not managed on the broadcaster side, the management mode is set at "Broadcast unmanaged" so as not to allow the specific process.

[Management Mode]

Figure 14:
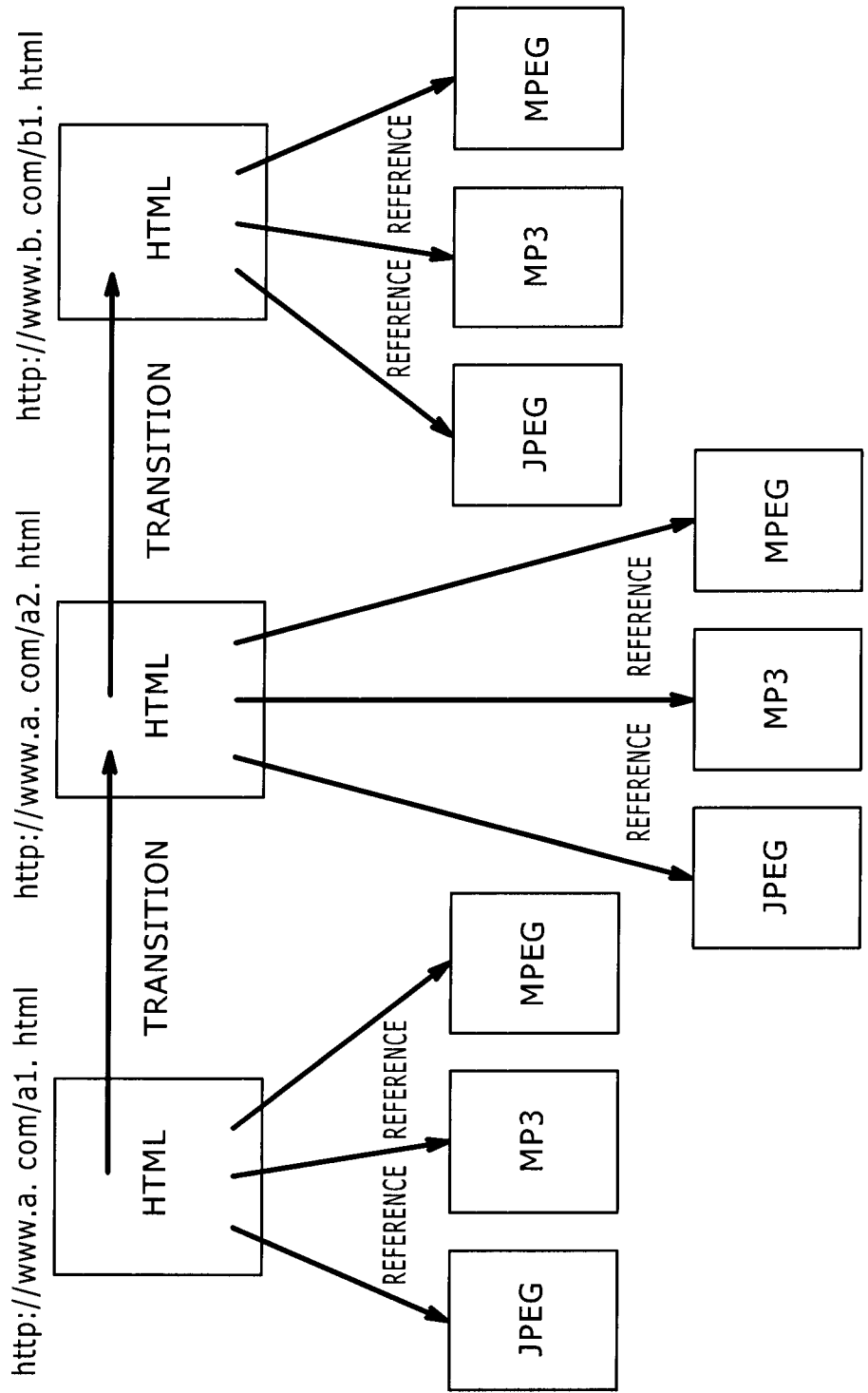
FIG. 14 is a diagram showing an example in which a transition is made from a TDO active operation state to a Web active operation state.

FIG. 14 shows an example in which a transition is made from the TDO active operation state to the Web active operation state, that is, the management mode is set from "Broadcast managed" to "Broadcast unmanaged" while events are sequentially fired in the TDO active operation state.

Incidentally, suppose that in a data broadcasting HTML document, a URL for identifying the HTML document to be executed to update the video 42 of data broadcasting contents is described in association with an event ID.

Thereby, in response to reception of trigger information whose trigger type is the application event, an HTML document "a1.html" for executing an event identified by an event ID included in the trigger information is obtained and executed on the basis of an URL "http://www.a.com/a1.html" described in the data broadcasting HTML document.

Further, in response to reception of new trigger information whose trigger type is the application event, an HTML document "a2.html" for executing an event identified by an event ID included in the trigger information is obtained and executed on the basis of an URL "http://www.a.com/a2.html" described in the data broadcasting HTML document. Thereby, the display of the video 42 is sequentially updated to video displayed by executing the HTML document "a1.html" and to video displayed by executing the HTML document "a2.html."

In addition, suppose that a link destination "http://www.b.com/b1.html" of an HTML document "b1.html" executed when a user operation of selecting the video of a driver displayed in the video 42 of data broadcasting contents (FIG. 3) is performed is described in the data broadcasting HTML document.

When the user operation of selecting the video of the driver displayed in the video 42 (FIG. 3) is performed in the TDO active operation state, a transition is made from the TDO active operation state to the Web active operation state.

In this case, the receiving device 30 in the Web active operation state obtains and executes the HTML document "b1.html" for a home page from a server not managed on the broadcaster side on the basis of the link destination "http://www.b.com/b1.html."

As shown in FIG. 14, when HTML documents to be executed are obtained from the server 12 and executed in the TDO active operation state, for example, the HTML documents (a1.html and a2.html in this case) are each obtained from the server 12 managed on the broadcaster side (http://www.a.com/ in this case).

In addition, HTML documents to be executed in the Web active operation state (b1.html in this case), for example, are obtained from a server not managed on the broadcaster side (http://www.b.com/ in this case).

As described above, the specific process is also allowed when an HTML document is obtained from the server 12 and executed, and the specific process needs to be prevented from being performed when an HTML document is obtained from a server other than the server 12 and executed.

Accordingly, the receiving device 30 determines whether an HTML document to be executed is obtained from the server 12 according to whether the domain name of the server 12 managed on the broadcaster side coincides with the domain name of a destination from which the HTML document to be executed is obtained.

Incidentally, the receiving device 30 regards the domain name (www.a.com in this case) of a destination from which an HTML document is obtained first in realizing service for data broadcasting, that is, a data broadcasting HTML document is obtained as the domain name of the server 12 managed on the broadcaster side, and determines whether an HTML document to be executed is obtained from the server 12.

The receiving device 30 sets the management mode to "Broadcast managed" or "Broadcast unmanaged" on the basis of whether the domain name of an HTML document to which a transition is made is the domain name of the server 12 managed on the broadcaster side.

Then, the receiving device 30 allows the specific process when the management mode is "Broadcast managed" (in the case of the TDO active operation state), and prevents the specific process from being performed when the management mode is "Broadcast unmanaged" (in the case of the Web active operation state).

Incidentally, while the receiving device 30 regards the domain name of a destination from which a data broadcasting HTML document is obtained in realizing service for data broadcasting as the domain name of the server 12 managed on the broadcaster side, the receiving device 30 may retain the domain name of a server managed by each broadcaster corresponding to each received channel in advance.

Then, the receiving device 30 may select a domain name corresponding to a received channel from the domain names retained in advance, and regard the domain name as the domain name of the server managed on the broadcaster side.

In addition, for example, while the receiving device 30 uses a domain name to determine whether an HTML document to be executed is obtained from the server 12, any information may be used as long as the information uniquely indicates the server as the obtaining destination. That is, for example, the receiving device 30 can determine whether an HTML document to be executed is obtained from the server 12 using not only the domain name but also a MAC (Media Access Control) address, an IP (Internet Protocol) address, or the like.

[Details of Management Mode Setting Process]

Figure 15:
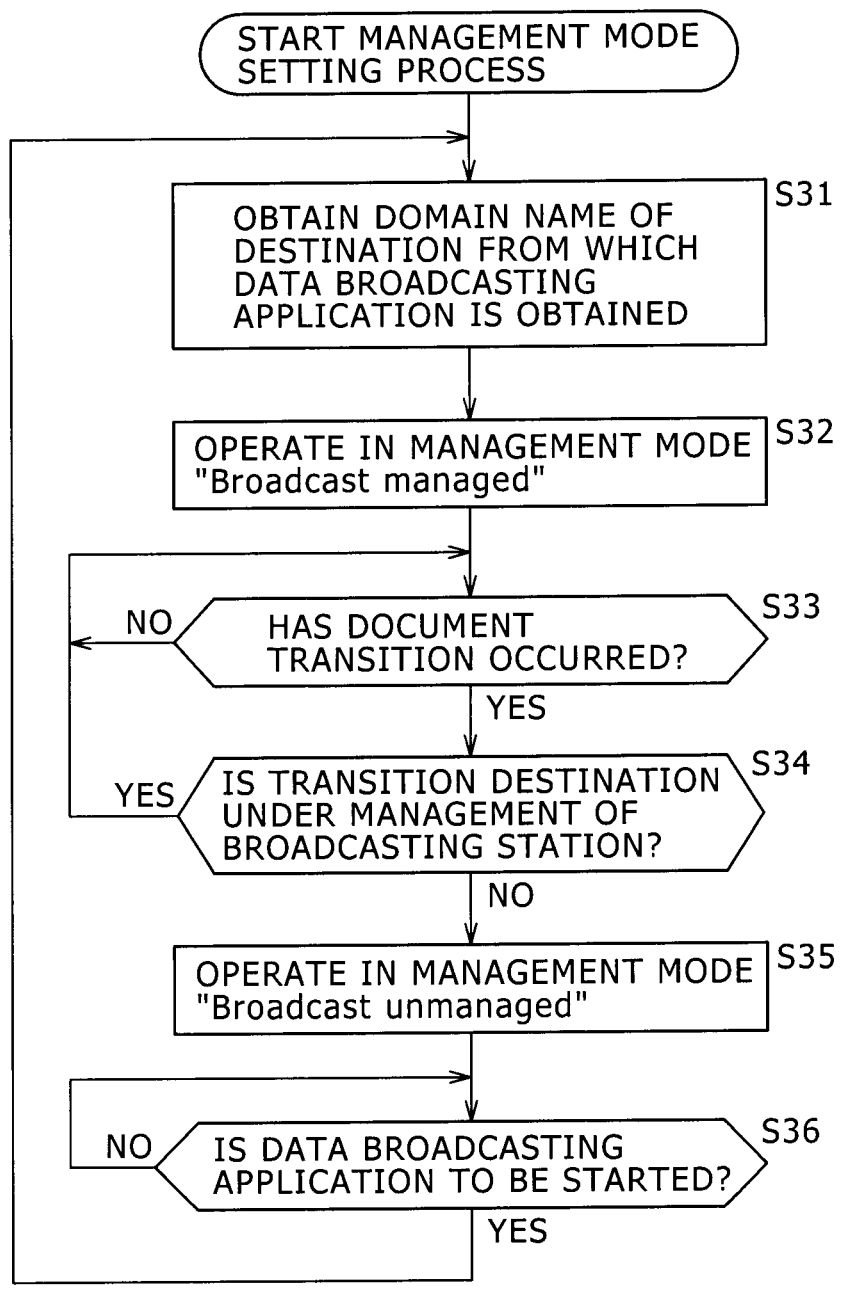
FIG. 15 is a flowchart of assistance in explaining a management mode setting process performed by the receiving device.

A management mode setting process in which the receiving device 30 sets the management mode on the basis of the domain name of a destination from which an HTML document is obtained will next be described with reference to a flowchart of FIG. 15.

This management mode setting process is started when a data broadcasting HTML document is started in step S11 in FIG. 10, for example.

In step S31, the controlling section 68 obtains the domain name of a destination from which the started data broadcasting HTML document is obtained.

Specifically, when the started data broadcasting HTML document is obtained on the basis of the application URL of trigger information in step S5 or step S14 in FIG. 10, for example, the controlling section 68 obtains the domain name of the destination (server 12) from which the started data broadcasting HTML document is obtained on the basis of the application URL of the trigger information.

When the started data broadcasting HTML document is read and obtained from the recording section 71 in step S6 in FIG. 10, for example, the controlling section 68 controls the browser 73 so as to make the browser 73 obtain the domain name of the server 12 retaining the started data broadcasting HTML document from the recording section 71 and supply the domain name of the server 12 to the controlling section 68. The controlling section 68 thereby obtains the domain name. Incidentally, suppose that when the data broadcasting HTML document is recorded in the recording section 71, the domain name of the server 12 retaining the data broadcasting HTML document is recorded in association with the data broadcasting HTML document.

In step S32, the controlling section 68 controls the browser 73 so as to make the browser 73 operate in the management mode "Broadcast managed" in which the specific process can be performed. That is, the controlling section 68 controls the execution of the HTML document in the browser 73 so as to allow the specific process to be performed by executing the HTML document (does not limit performing the specific process).

In step S33, the controlling section 68 determines whether a document transition according to an HTML document has occurred on the basis of input trigger information, an operating signal from the operating section 70, or the like. The controlling section 68 waits for a document transition to occur, and then advances the process to step S34.

In step S34, the controlling section 68 determines whether the HTML document as transition destination is obtained from the server 12 managed on the broadcaster side on the basis of whether the domain name of a destination from which the HTML document as transition destination is obtained coincides with the domain name already obtained in the process of step S31. When it is determined in step S34 that the HTML document as transition destination is obtained from the server 12, the process is returned to step S33, and a similar process is thereafter performed with the browser 73 operated in the management mode "Broadcast managed."

When it is determined in step S34 that the HTML document as transition destination is not obtained from the server 12, the process is advanced to step S35, where the controlling section 68 controls the browser 73 so as to make the browser 73 operate in the management mode "Broadcast unmanaged" in which the specific process cannot be performed. That is, the controlling section 68 controls the execution of the HTML document in the browser 73 so as not to allow the specific process to be performed by executing the HTML document (limits performing the specific process).

In this case, in step S35, the browser 73 cannot perform the specific process, and for example executes an HTML document for a home page as HTML document as transition destination. Incidentally, suppose that the data broadcasting HTML document is ended on the basis of trigger information whose trigger type is the application end, for example, while the HTML document for the home page is executed.

Thereafter, in step S36, the controlling section 68 determines whether to start a new data broadcasting HTML document, and waits to determine that a new data broadcasting HTML document is to be started. The controlling section 68 then returns the process to step S31, and a similar process is thereafter repeated. Specifically, for example, the controlling section 68 determines whether trigger information for starting a new data broadcasting HTML document is input, and waits to determine that the trigger signal is input. The controlling section 68 then returns the process to step S31, and a similar process is thereafter repeated.

As described above, in the management mode transition process, the management mode is set at "Broadcast managed" when the domain name of a data broadcasting HTML document and the domain name of an HTML document as transition destination coincide with each other, and the management mode is set at "Broadcast unmanaged" when the domain name of a data broadcasting HTML document and the domain name of an HTML document as transition destination do not coincide with each other.

When the management mode is set at "Broadcast managed," for example a process of reading area information of the user which area information is already stored in the receiving device 30 or the like is allowed to be performed by executing a data broadcasting HTML document. When the management mode is set at "Broadcast unmanaged," the reading process or the like is prevented from being performed by executing an HTML document for a home page as a process unintended by the user.

Thus, the process unintended by the user can be prevented from being performed even when an HTML document for a home page created by a malicious third party is obtained and executed.

<2. Example of Modification>

In the present embodiment, as shown in FIG. 13, the operation states of a data broadcasting HTML document are four operations states, that is, the TDO stop operation state, the TDO pre-cache ready operation state, the TDO active state, and the Web active state. However, as shown in FIG. 16, for example, the operation states of a data broadcasting HTML document can be five operation states including a newly added TDO suspend operation state (corresponding to TDO Suspend in FIG. 16).

In this case, as shown in FIG. 17, suspend is newly added as the trigger type of trigger information, and the trigger type of trigger information indicates one of the application start, the application end, the application event, the pre-cache, and the suspend.

Figure 16:
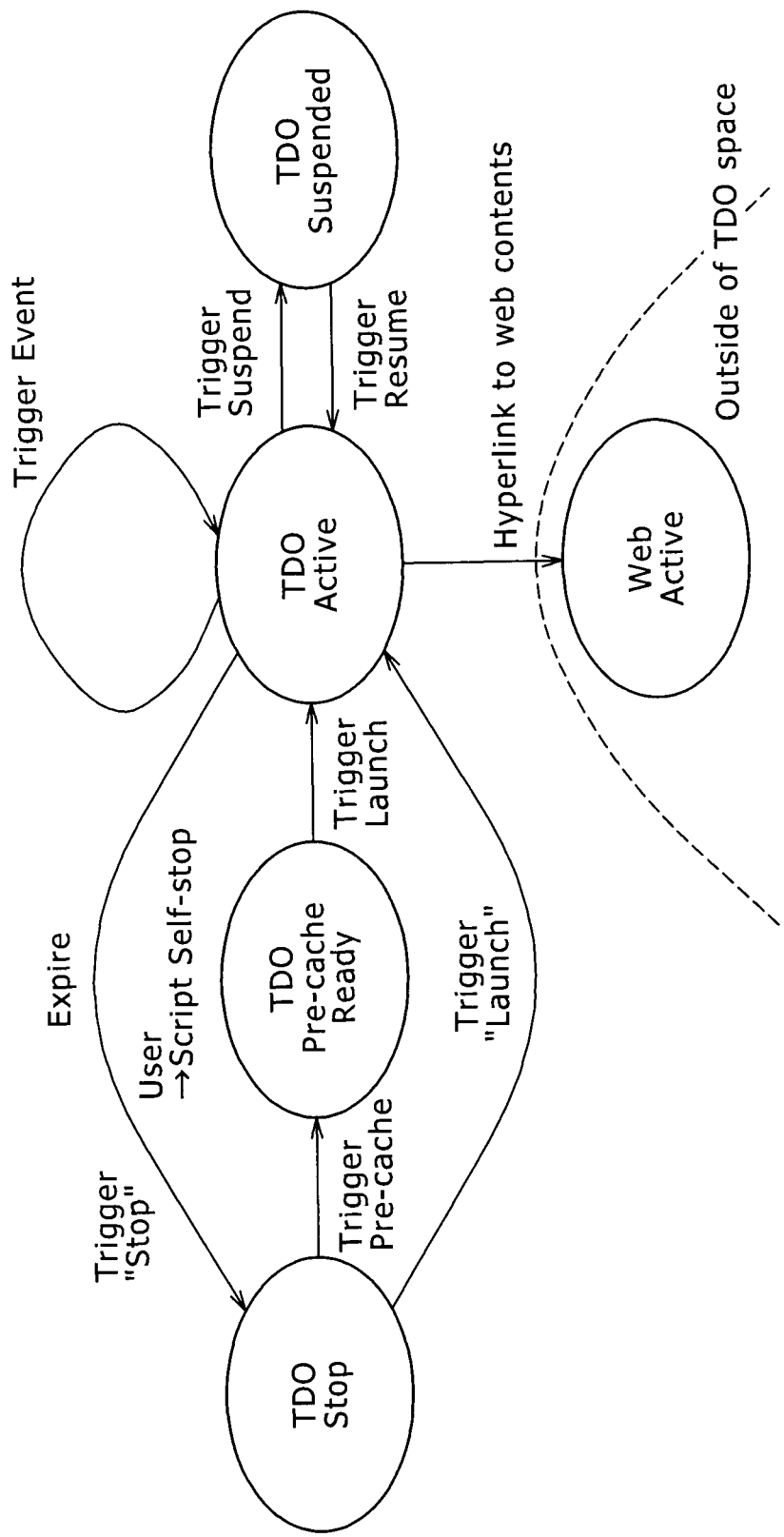
FIG. 16 is another diagram showing an example of a life cycle of a data broadcasting HTML document.

In FIG. 16, when trigger information whose trigger type is the suspend is received in the TDO active operation state, the operation state of a corresponding data broadcasting HTML document makes a transition to the TDO suspend operation state. In this case, because the operation state of a corresponding data broadcasting application makes a transition to the TDO suspend operation state, another data broadcasting HTML document can be set in the TDO active operation state and executed.

When trigger information whose trigger type is the application start is received in the TDO suspend operation state, the corresponding data broadcasting HTML document makes a transition to the TDO active operation state. Thereby, an event can be fired in the data broadcasting HTML document. At this time, the other data broadcasting HTML document makes a transition from the TDO active operation state to the TDO suspend operation state.

The series of processes described above can be carried out not only by hardware but also by software. When the series of processes is to be carried out by software, a program constituting the software is installed from a program recording medium onto a computer incorporated in dedicated hardware or for example a general-purpose personal computer that can perform various functions by installing various programs thereon.

[Example of Configuration of Computer]

FIG. 18 is a block diagram showing an example of hardware configuration of a computer performing the series of processes described above by a program.

In this computer 100, a CPU (Central Processing Unit) 101, a ROM (Read Only Memory) 102, and a RAM (Random Access Memory) 103 are interconnected by a bus 104.

The bus 104 is further connected with an input-output interface 105. The input-output interface 105 is connected with an inputting section 106 formed by a keyboard, a mouse, a microphone and the like, an outputting section 107 formed by a display, a speaker and the like, a storing section 108 formed by a hard disk, a nonvolatile memory and the like, a communicating section 109 formed by a network interface and the like, and a drive 110 for driving removable media 111 such as a magnetic disk, an optical disk, a magneto-optical disk, a semiconductor memory and the like.

In the computer configured as described above, the CPU 101 for example loads a program stored in the storage section 108 into the RAM 103 via the input-output interface 105 and the bus 104, and then executes the program. Thereby the series of processes described above is performed.

It is to be noted that the program executed by the computer may be a program in which processing is performed in time series in the order described in the present specification or may be a program in which processing is performed in parallel or in necessary timing such as at a time of a call being made, for example.

In addition, the program may be processed by one computer, or may be subjected to distributed processing by a plurality of computers. Further, the program may be transferred to a remote computer and executed by the remote computer.

In addition, in the present specification, a system refers to an apparatus as a whole formed by a plurality of devices.

It is to be noted that embodiments of the present invention are not limited to the foregoing embodiments, and that various changes can be made without departing from the spirit of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A receiving device for receiving AV content, the receiving device comprising:
an AV content receiving section configured to receive location information of data content corresponding to the AV content;
a communication section configured to access a server corresponding to the location information and to obtain the data content via a network;
a control section configured to execute the data content, wherein
when the data content executed by the control section is managed on a provider side, the data content is permitted to perform a specific process, and
when the data content executed by the control section is not managed on the provider side, performance of the specific process by the data content is prohibited.

2. The receiving device according to claim 1, further comprising:
an output section configured to output video including an image of the data content superimposed on video of the AV content.

3. The receiving device according to claim 1, wherein
the control section is configured to permit the data content to perform the specific process, or prohibit the performance of the specific process by the data content, according to a management mode set in the receiving device.

4. The receiving device according to claim 1, wherein
the specific process is a predetermined process that needs to be prevented from being performed when the server from which the data content is obtained is not a provider server.

5. A method of a receiving device for receiving audio/video (AV) content, the method comprising:
receiving, by the receiving device, location information of data content corresponding to the AV content;
accessing, by the receiving device, a server corresponding to the location information and obtaining the data content via a network; and
executing, by the receiving device, the data content, wherein the step of executing includes
when the data content executed by the receiving device is managed on a provider side, permitting the data content to perform a specific process, and
when the data content executed by the receiving device is not managed on the provider side, prohibiting performance of the specific process by the data content.

6. The method according to claim 5, further comprising:
outputting video including an image of the data content superimposed on video of the AV content.

7. The method according to claim 5, wherein the step of executing comprises:
permitting the data content to perform the specific process, or prohibiting performance of the specific process by the data content, according to a management mode set in the receiving device.

8. The method according to claim 5, wherein
the specific process is a predetermined process that needs to be prevented from being performed when the server from which the data content is obtained is not a provider server.

9. A transmitting device for transmitting audio/video (AV) content, the transmitting device comprising:
a transmitter configured to transmit, to a receiving device, location information of data content corresponding to the AV content, wherein
the location information corresponds to a server that stores the data content, the data content being managed by a provider side or not managed by the provider side,
when the data content is managed by the provider side and is executed by the receiving device, the data content is permitted to perform a specific process, and
when the data content is not managed by the provider side and is executed by the receiving device, prohibiting performance of the specific process by the data content.

10. A method of a transmitting device for transmitting audio/video (AV) content, the method comprising:

transmitting, by a transmitter of the transmitting device and to a receiving device, location information of data content corresponding to the AV content, wherein the location information corresponds to a server that stores the data content, the data content being managed by a provider side or not managed by the provider side, when the data content is managed by the provider side and is executed by the receiving device, the data content is permitted to perform a specific process, and when the data content is not managed by the provider side and is executed by the receiving device, performance of the specific process by the data content is prohibited.

\* \* \* \* \*